US010491887B2

(12) United States Patent
Haimovitch-Yogev et al.

(10) Patent No.: US 10,491,887 B2
(45) Date of Patent: *Nov. 26, 2019

(54) SYSTEM AND METHOD OF LIMITING PROCESSING BY A 3D RECONSTRUCTION SYSTEM OF AN ENVIRONMENT IN A 3D RECONSTRUCTION OF AN EVENT OCCURRING IN AN EVENT SPACE

(71) Applicant: Intel Corporation, Santa Clara, CA (US)

(72) Inventors: Oren Haimovitch-Yogev, Tel Aviv (IL); Matteo Shapira, Tel Aviv (IL); Aviv Shapira, Tel Aviv (IL); Diego Prilusky, Tel Aviv (IL); Yaniv Ben Zvi, Tel Aviv (IL); Adi Gilat, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,799

(22) Filed: Dec. 18, 2017

(65) Prior Publication Data

US 2018/0261002 A1    Sep. 13, 2018

Related U.S. Application Data

(63) Continuation of application No. 14/909,660, filed as application No. PCT/US2015/023772 on Apr. 1, 2015, now Pat. No. 9,846,961.
(Continued)

(51) Int. Cl.
*G06T 15/20* (2011.01)
*H04N 13/282* (2018.01)
(Continued)

(52) U.S. Cl.
CPC ......... *H04N 13/282* (2018.05); *G01B 11/245* (2013.01); *G06T 7/11* (2017.01);
(Continued)

(58) Field of Classification Search
CPC .................................................... H04N 13/282
(Continued)

(56) References Cited

U.S. PATENT DOCUMENTS 5,600,368 A    2/1997    Matthews, III
6,975,756 B1    12/2005    Slabaugh et al.
(Continued)

FOREIGN PATENT DOCUMENTS

JP    2004062755 A    2/2004
JP    2006302011 A    11/2006
(Continued)

OTHER PUBLICATIONS

Final Office Action from U.S. Appl. No. 14/675,906, dated Feb. 1, 2019, 15 pages.
(Continued)

*Primary Examiner* — Javid A Amini
(74) *Attorney, Agent, or Firm* — Nicholson De Vos Webster & Elliott LLP

(57) ABSTRACT

A method of limiting processing by a 3D reconstruction system of an environment in a 3D reconstruction of an event includes dividing by the subdivision module the volume into sub-volumes; projecting from each camera each of the sub-volumes to create a set of sub-volumes masks relative to each camera; creating an imaging mask for each camera; comparing for each camera by the subdivision module the respective imaging mask to the respective subvolume mask and extracting at least one feature from at least one imaging mask; saving by the subdivision module the at least one feature to a subspace division mask; cropping the at least one
(Continued)

feature from the imaging frames using the subspace division mask; and processing only the at least one feature for a 3D reconstruction. The system includes cameras for recording the event in imaging frames; and a subdivision module for dividing the volume into sub-volumes.

20 Claims, 19 Drawing Sheets

Related U.S. Application Data

(60) Provisional application No. 61/986,439, filed on Apr. 30, 2014, provisional application No. 62/071,943, filed on Oct. 31, 2014, provisional application No. 62/073,596, filed on Oct. 31, 2014.

(51) Int. Cl.
| | |
|---|---|
| *H04N 5/247* | (2006.01) |
| *H04N 5/232* | (2006.01) |
| *G06T 15/10* | (2011.01) |
| *H04N 21/218* | (2011.01) |
| *H04N 21/81* | (2011.01) |
| *G06T 7/50* | (2017.01) |
| *G06T 7/11* | (2017.01) |
| *H04N 13/204* | (2018.01) |
| *G06T 11/00* | (2006.01) |
| *G01B 11/245* | (2006.01) |
| *H04N 13/194* | (2018.01) |
| *H04N 13/161* | (2018.01) |
| *H04N 13/218* | (2018.01) |

(52) U.S. Cl.
CPC .............. *G06T 7/50* (2017.01); *G06T 11/003* (2013.01); *G06T 15/10* (2013.01); *G06T 15/205* (2013.01); *H04N 5/23206* (2013.01); *H04N 5/23229* (2013.01); *H04N 5/247* (2013.01); *H04N 13/161* (2018.05); *H04N 13/194* (2018.05); *H04N 13/204* (2018.05); *H04N 13/218* (2018.05); *H04N 21/21805* (2013.01); *H04N 21/816* (2013.01); *G06T 2200/16* (2013.01); *G06T 2207/20152* (2013.01); *G06T 2210/22* (2013.01)

(58) Field of Classification Search
USPC ......................................................... 345/626
See application file for complete search history.

(56) References Cited

U.S. PATENT DOCUMENTS

| | | | |
|---|---|---|---|
| 7,126,603 B2 | 10/2006 | Aliaga et al. | |
| 8,264,524 B1 | 9/2012 | Davey | |
| 9,286,668 B1 | 3/2016 | Angilivelil et al. | |
| 9,846,961 B2* | 12/2017 | Haimovitch-Yogev | H04N 5/247 |
| 2003/0231179 A1 | 12/2003 | Suzuki | |
| 2004/0017504 A1 | 1/2004 | Prandoni et al. | |
| 2004/0267873 A1 | 12/2004 | Shen et al. | |
| 2005/0018045 A1 | 1/2005 | Thomas et al. | |
| 2006/0024041 A1 | 2/2006 | Lou et al. | |
| 2006/0038890 A1 | 2/2006 | MacIntosh et al. | |
| 2007/0285575 A1 | 12/2007 | Gloudemans et al. | |
| 2008/0181457 A1 | 7/2008 | Chattopadhyay et al. | |
| 2008/0192116 A1 | 8/2008 | Tamir et al. | |
| 2009/0092312 A1 | 4/2009 | Kasahara et al. | |
| 2009/0128549 A1 | 5/2009 | Gloudemans et al. | |
| 2009/0315978 A1 | 12/2009 | Wuermlin et al. | |
| 2010/0125799 A1 | 5/2010 | Roberts et al. | |
| 2010/0208942 A1 | 8/2010 | Porter et al. | |
| 2011/0033126 A1 | 2/2011 | Liu et al. | |
| 2011/0115615 A1 | 5/2011 | Luo et al. | |
| 2011/0221745 A1 | 9/2011 | Goldman et al. | |
| 2011/0244954 A1 | 10/2011 | Goldman et al. | |
| 2012/0229607 A1 | 9/2012 | Baker et al. | |
| 2013/0016097 A1* | 1/2013 | Coene ................... G06T 15/205 345/419 |
| 2013/0063549 A1 | 3/2013 | Schnyder et al. | |
| 2013/0070047 A1 | 3/2013 | DiGiovanni et al. | |
| 2013/0141523 A1 | 6/2013 | Banta et al. | |
| 2014/0176726 A1 | 6/2014 | Millward et al. | |
| 2014/0354645 A1 | 12/2014 | Imber et al. | |
| 2015/0201176 A1 | 7/2015 | Graziosi et al. | |

FOREIGN PATENT DOCUMENTS

| | | |
|---|---|---|
| JP | 2007133660 A | 5/2007 |
| JP | 2008015756 A | 1/2008 |
| JP | 2009539155 A | 11/2009 |
| KR | 20060021566 A | 3/2006 |
| KR | 20130120914 A | 11/2013 |
| WO | 2011121117 A1 | 10/2011 |
| WO | 2012132237 A1 | 10/2012 |

OTHER PUBLICATIONS

Non-Final Office Action from U.S. Appl. No. 14/675,920, dated Jan. 10, 2019, 50 pages.
Debevec P.E., et al., "Modeling and Rendering Architecture from Photographs: A Hybrid Geometry- and Image-Based Approach," Jan. 19, 1996, SIGGRAPH '96 Proceedings of the 23rd annual conference on Computer graphics and interactive techniques, 33 pages.
Extended European Search Report for Application No. 15786510.6, dated Feb. 2, 2017, 5 pages.
Extended European Search Report for Application No. 15786670.8, dated Mar. 21, 2017, 6 pages.
Final Office Action from U.S. Appl. No. 14/675,906, dated Feb. 7, 2018, 19 pages.
Final Office Action from U.S. Appl. No. 14/675,920, dated Feb. 14, 2018, 52 pages.
Final Office Action from U.S. Appl. No. 14/675,920, dated Nov. 15, 2016, 36 pages.
International Preliminary Report on Patentability for Application No. PCT/US2015/023772, dated Nov. 10, 2016, 6 pages.
International Preliminary Report on Patentability for Application No. PCT/US2015/023776, dated Nov. 10, 2016, 6 pages.
International Search Report and Written Opinion for Application No. PCT/US2015/023772, dated Jun. 24, 2015, 9 pages.
International Search Report and Written Opinion for Application No. PCT/US2015/023776, dated Jun. 24, 2015, 9 pages.
Martins, et al., "A Video Coder using 3-D Model Based Background for Video Surveillance Applications," Image Processing, The IEEE Computer Society, Oct. 4, 1998, vol. 2, pp. 919-923.
Non-Final Office Action from U.S. Appl. No. 14/675,906, dated Jul. 27, 2018, 18 pages.
Non-Final Office Action from U.S. Appl. No. 14/675,906, dated Jun. 9, 2017, 21 pages.
Non-Final Office Action from U.S. Appl. No. 14/675,920, dated Apr. 13, 2016, 26 pages.
Non-Final Office Action from U.S. Appl. No. 14/675,920, dated Jun. 9, 2017, 43 pages.
Notice of Allowance from U.S. Appl. No. 14/909,660, dated Aug. 4, 2017, 23 pages.
Notice of Allowance from U.S. Appl. No. 14/910,163, dated Jan. 25, 2018, 16 pages.
Notice of Allowance from U.S. Appl. No. 14/910,163, dated May 8, 2018, 14 pages.
Non-Final Office Action from U.S. Appl. No. 16/114,007, dated May 3, 2019, 13 pages.

(56) References Cited

OTHER PUBLICATIONS

Notice of Reasons for Rejection from foreign counterpart Japanese Patent Application No. 2017-509586, dated May 7, 2019, 5 pages.
Notice of Reasons for Rejection from foreign counterpart Japanese Patent Application No. 2017-509587, dated May 7, 2019, 3 pages.

* cited by examiner

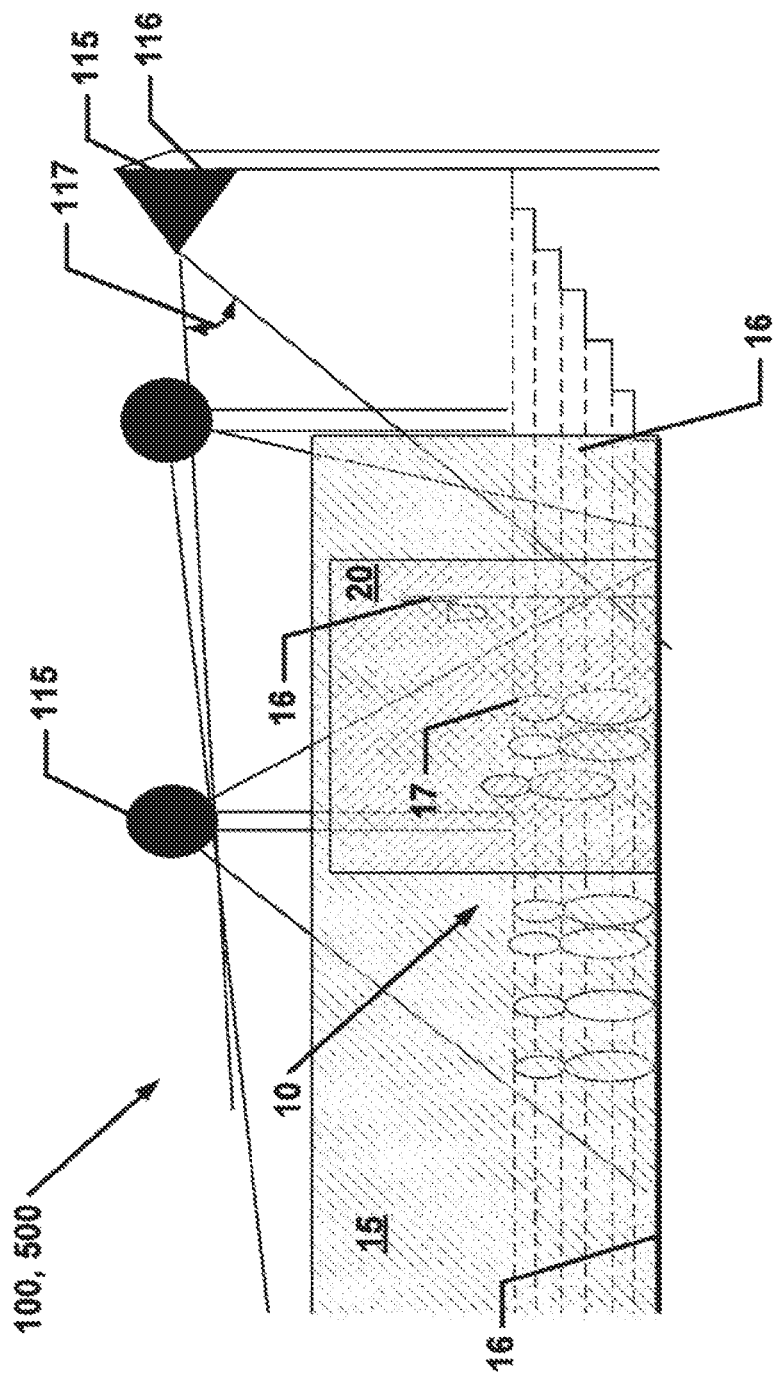

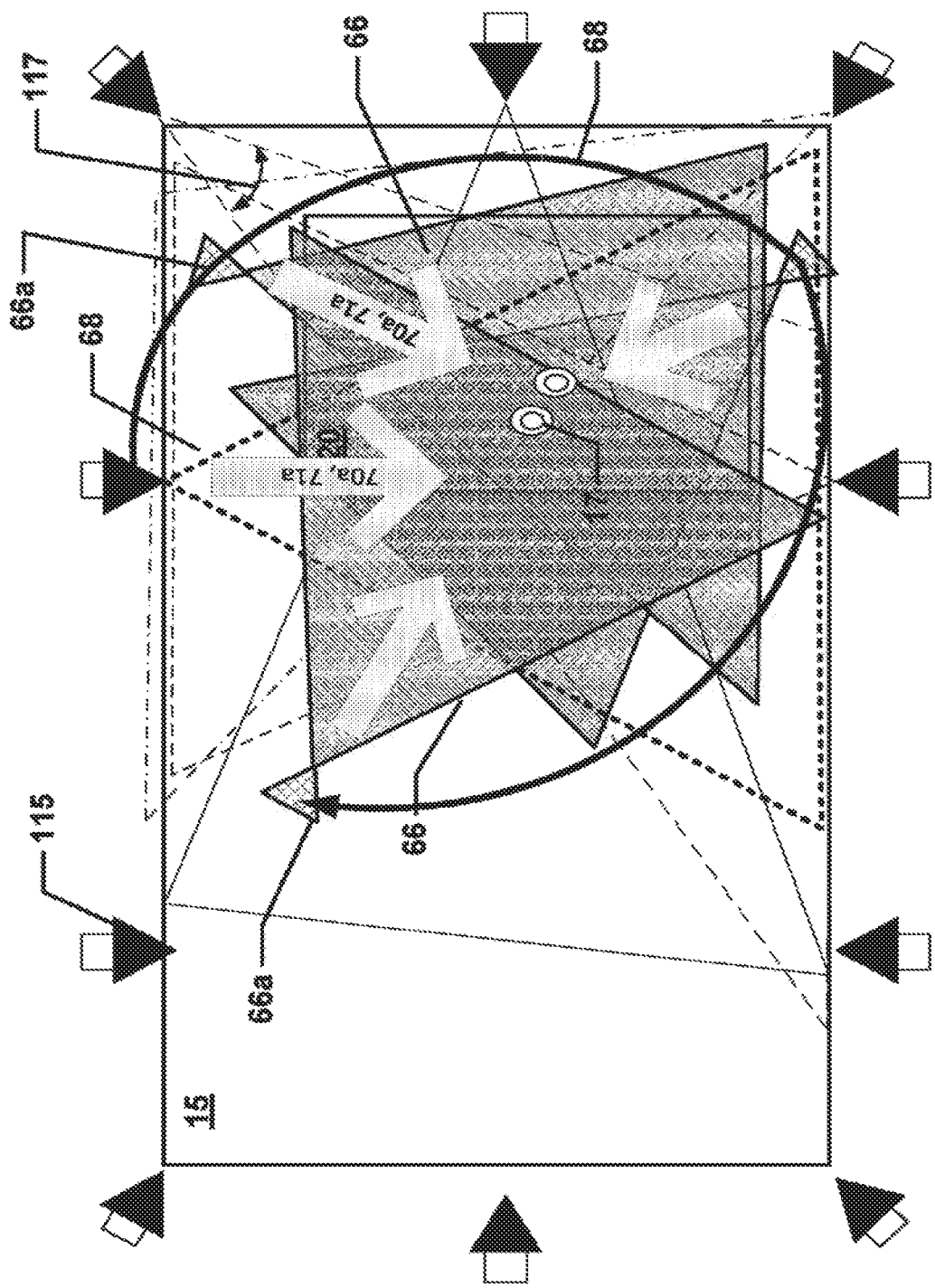

SYSTEM AND METHOD OF LIMITING PROCESSING BY A 3D RECONSTRUCTION SYSTEM OF AN ENVIRONMENT IN A 3D RECONSTRUCTION OF AN EVENT OCCURRING IN AN EVENT SPACE

CROSS-REFERENCE TO RELATED APPLICATIONS

This application is a continuation of U.S. patent application Ser. No. 14/909,660, filed Feb. 2, 2016 which is a U.S. National Phase Application under 35 U.S.C. § 371 of International Application No. PCT/US2015/023772, filed Apr. 1, 2015, which claims the benefit of U.S. Provisional Patent Application 61/986,439, filed Apr. 30, 2014, all of which is incorporated in its entirety by reference for all purposes.

This application is a non-provisional counterpart to and claims priority from U.S. Ser. No. 62/071,943, which was filed Oct. 31, 2014, and which is incorporated in its entirety by reference for all purposes.

This application is a non-provisional counterpart to and claims priority from U.S. Ser. No. 62/073,596, which was filed Oct. 31, 2014, and which is incorporated in its entirety by reference for all purposes.

BACKGROUND OF THE INVENTION

1. Field of the Invention

The invention relates to a system and method for image and video reconstruction from multiple cameras. Specifically, the invention relates to limiting processing requirements by the system.

2. Discussion of the Related Art

Multi-view reconstruction is the process by which a plurality of two-dimensional images of one or more volumetric objects is combined to create a single three-dimensional data representation of the objects. The representation can be rendered from any angle for a user.

Multi-view reconstruction is typically achieved using a point-cloud model derived from data that are extracted from the two-dimensional images and allocated to a three-dimensional virtual space. The computational challenge to build a point-cloud has been solved many times. However, known solutions have several drawbacks.

One significant drawback has been the inability to provide photo-realistic rendered output because known systems are unable to differentiate between objects that are being observed, e.g., foreground, and objects that are in the environment, e.g., background, to avoid the problem of occlusion.

A first type of occlusion is encountered when a virtual rendering camera is projected through an object that it should instead be projected on. The second type of occlusion occurs when a part of the object occludes itself, such as the hand of a player is in the foreground relative to virtual configuration and rendering camera and occludes a portion of the player's torso. When occlusion occurs, and is not solved properly during rendering, it destroys a viewer's perception of the accuracy of the rendered output.

A further significant drawback is that colors are either entirely consistent, e.g., flat, or abruptly vary, e.g., jump, when the virtual rendering camera pans from one position to another. Such color issues are highly inconsistent with a viewer's normal perception. Photo-realistic results would radically extend the usability of the multi-view reconstruction to applications where currently humans are in proximity to the objects.

Thus, what is desired is multi-view reconstruction that provides a photo-realistic output that effectively solves occlusion and color problems.

What is also desired is limiting processing requirements by the system.

SUMMARY OF THE INVENTION

These and other objectives are met by one or more embodiments of the present invention.

A system for multi-view reconstruction of a photo-realistic rendering of an event includes a plurality of cameras for imaging the event with a plurality of image frames; a controller having a CEM module for modeling an environment from image data of the image frames, an FES module for segmenting a foreground from the environment from image data of the image frames and constructing a 3D data representation; and a configuration and rendering engine includes a path selection module, the configuration and rendering engine for configuration and rendering the photo-realistic rendering along a path selected by a user using the path selection module, the path comprising at least one novel view image. The photo-realistic rendering has 10% or less discrepancy between a plurality of output pixel raster values of the novel view image and the image frames imaged by the cameras. The discrepancy is preferably based on a 10% or less percentage difference in the position and orientation of the novel view images the image difference to two or more physical camera sensors.

A system for multi-view reconstruction of a photo-realistic rendering of an event, the system including a plurality of cameras for imaging the event with a plurality of image frames, the event comprising a foreground and an environment; a CEM module for modeling the environment from image data of the image frames; an FES module for segmenting the foreground from the environment from image data of the image frames and constructing a 3D data representation, a configuration engine for configuring and rendering the photo-realistic rendering; a viewing device for receiving the replay for display to a viewer; and a path selection module for selecting, by a user, in the replay a path comprising at least one novel view image; wherein the photo-realistic rendering comprises less than 10% discrepancy between a plurality of output pixel raster values of the novel view image and the image frames imaged by the cameras.

A method of reconstructing of a photo-realistic rendering of an event with user-selectable novel views, the method including imaging the event with a plurality of cameras for producing a plurality of image frames, the event comprising a foreground and an environment; modeling, by a CEM module, the environment from image data of the image frames; (c) segmenting, by an FES module, the foreground from the environment from image data of the image frames and constructing a 3D data representation; configuring and rendering, by a configuration engine, a replay of the event; receiving, by a viewing device, the replay for display to a viewer; selecting, by a user using a path selection module on the viewing device, a viewing path comprising at least one novel view image; wherein the photo-realistic rendering comprises less than 10% discrepancy between a plurality of output pixel raster values of the novel view image and the image frames imaged by the cameras.

A method of limiting processing by a 3D reconstruction system of an environment in a 3D reconstruction of an event occurring in an event space includes:

(a) determining by a user a volume of the event space;
(b) defining by a user the volume for a system, the system comprising a subdivision module and a plurality of cameras, the plurality of cameras for recording the event in a plurality of imaging frames;
(c) dividing by the subdivision module the volume into a plurality of sub-volumes, the volume comprising the plurality of sub-volumes;
(d) projecting from each camera by the subdivision module each of the sub-volumes to create a plurality of sub-volume masks relative to each camera;
(e) recording the event by the system;
(f) creating by the subdivision module an imaging mask for each camera;
(g) comparing for each camera by the subdivision module the respective imaging mask to the respective sub-volume mask and extracting by the subdivision module at least one feature from at least one imaging mask, the at least one feature related to the event;
(h) saving by the subdivision module the at least one feature to a subspace division mask;
(i) cropping by the system of the at least one feature from the imaging frames using the subspace division mask; and
(j) processing by the system only the at least one feature for a 3D reconstruction.

The system further comprises a server associated with the plurality of cameras; and the method further comprises between steps (d) and (e) the step of storing by the subdivision module each of the sub-volume masks in a memory of the server.

In accordance with one or more embodiments of the present invention, the system further comprises a plurality of servers, each server associated with a respective camera of the plurality of cameras; the method further comprises between steps (d) and (e) the step of storing by the subdivision module the sub-volume mask associated with the respective camera in a memory of the server associated with that respective camera.

A system for limiting processing of an environment in a 3D reconstruction of an event occurring in an event space, the event space comprising a volume includes
 a plurality of cameras, the plurality of cameras for recording the event in a plurality of imaging frames;
 a subdivision module
  dividing the volume into a plurality of sub-volumes, the volume comprising the plurality of sub-volumes;
  projecting from each camera by the subdivision module each of the sub-volumes to create a plurality of sub-volume masks relative to each camera;
  recording the event by the system;
  creating by the subdivision module an imaging mask for each camera;
  comparing for each camera by the subdivision module the respective imaging mask to the respective sub-volume mask and extracting by the subdivision module at least one feature from at least one imaging mask, the at least one feature related to the event;
  saving by the subdivision module the at least one feature to a subspace division mask;
  cropping by the system of the at least one feature from the imaging frames using the subspace division mask; and
 wherein the system processes only the at least one feature for a 3D reconstruction.

A system for social interaction using a photo-realistic novel view of an event, the system includes
 a multi-view reconstruction system for developing transmission data of the event;
 a plurality of client-side rendering device, each device receiving the transmission data from the multi-view reconstruction system and rendering the transmission data as the photo-realistic novel view.

A method of social interaction using a photo-realistic novel view of an event, the method comprising the steps of:
(a) transmitting by a server side transmission data of the event;
(b) receiving by a first user on a first rendering device the data transmission;
(c) selecting by the first user a path for rendering on the first rendering device at least on novel view;
(d) rendering by the first rendering device the at least one novel view; and
(e) saving by the user on the first rendering device novel view date for the at least one novel view.

A method of generating user-selectable novel views of an event on a viewing device, the method includes the steps of:
(a) reconstructing by a server system for each camera of a plurality of cameras image data into at least one foreground model for the respective camera and at least one environment model for the respective camera;
(b) joining by the server system the at least one foreground model for each camera to create a visual atlas of all foreground models;
(c) creating by the server system foreground mapping data for foreground image data in the visual atlas to a 30 coordinate in a 30 data representation;
(d) projecting by the server system environment image data of all cameras for each camera onto each respective environment model;
(e) creating by the server system environment mapping data for environment image data in each respective environment model to a 30 coordinate in a 30 data representation;
(f) saving by the server system for each camera the respective environment model as an environment image;
(g) compressing by the server system the foreground mapping data, the environment mapping data, and a depth map;
(h) inserting by the server system the visual atlas into each respective environment model as a new image frame in an image sequence by projecting background rasters on each respective environment model;
(i) compressing by the server system the visual atlas;
(j) compressing by the server system the respective environment images and the respective environment models;
(k) transmitting by the server system each compressed data in a sequence it was compressed;
(l) receiving by the viewing device all compressed data;
(m) uncompressing by the viewing device all compressed data;
(n) selecting by a user on the viewing device the novel view; and
(o) rendering by the viewing device the respective environment images onto the respective environment models for each novel view.

An interactive-player system for generating user-selectable novel views of an event on a viewing device, the multi-view reconstruction system includes
a server system and a viewing device;
the server system
   (a) reconstructing for each camera of a plurality of cameras image data into at least one foreground model for the respective camera and at least one environment model for the respective camera;
   (b) joining the at least one foreground model for each camera to create a visual atlas of all foreground models;
   (c) creating foreground mapping data for foreground image data in the visual atlas to a 3D coordinate in a 3D data representation;
   (d) projecting environment image data of all cameras for each camera onto each respective environment model;
   (e) creating environment mapping data for environment image data in each respective environment model to a 3D coordinate in a 3D data representation;
   (f) saving for each camera the respective environment model as an environment image;
   (g) compressing the foreground mapping data, the environment mapping data, and a depth map;
   (h) inserting the visual atlas into each respective environment model as a new image frame in an image sequence by projecting background rasters on each respective environment model;
   (i) compressing the visual atlas;
   (j) compressing the respective environment images and the respective environment models;
   (k) transmitting each compressed data m a sequence it was compressed;
the viewing device
   receiving all compressed data;
   uncompressing all compressed data;
   selecting by a user on the viewing device the novel view; and
   rendering by the viewing device the respective environment images onto the respective environment models for each novel view.

BRIEF DESCRIPTION OF THE DRAWINGS

FIG. 2B is an elevational view of a portion of the event and event space in FIG. 2A.

FIG. 2D is a plan view of virtual cameras, a plurality of novel views, a portion of a view path, view fields of real cameras in the event space of FIG. 2A and FIG. 2C.

DETAILED DESCRIPTION OF THE INVENTION

Figure 1A:
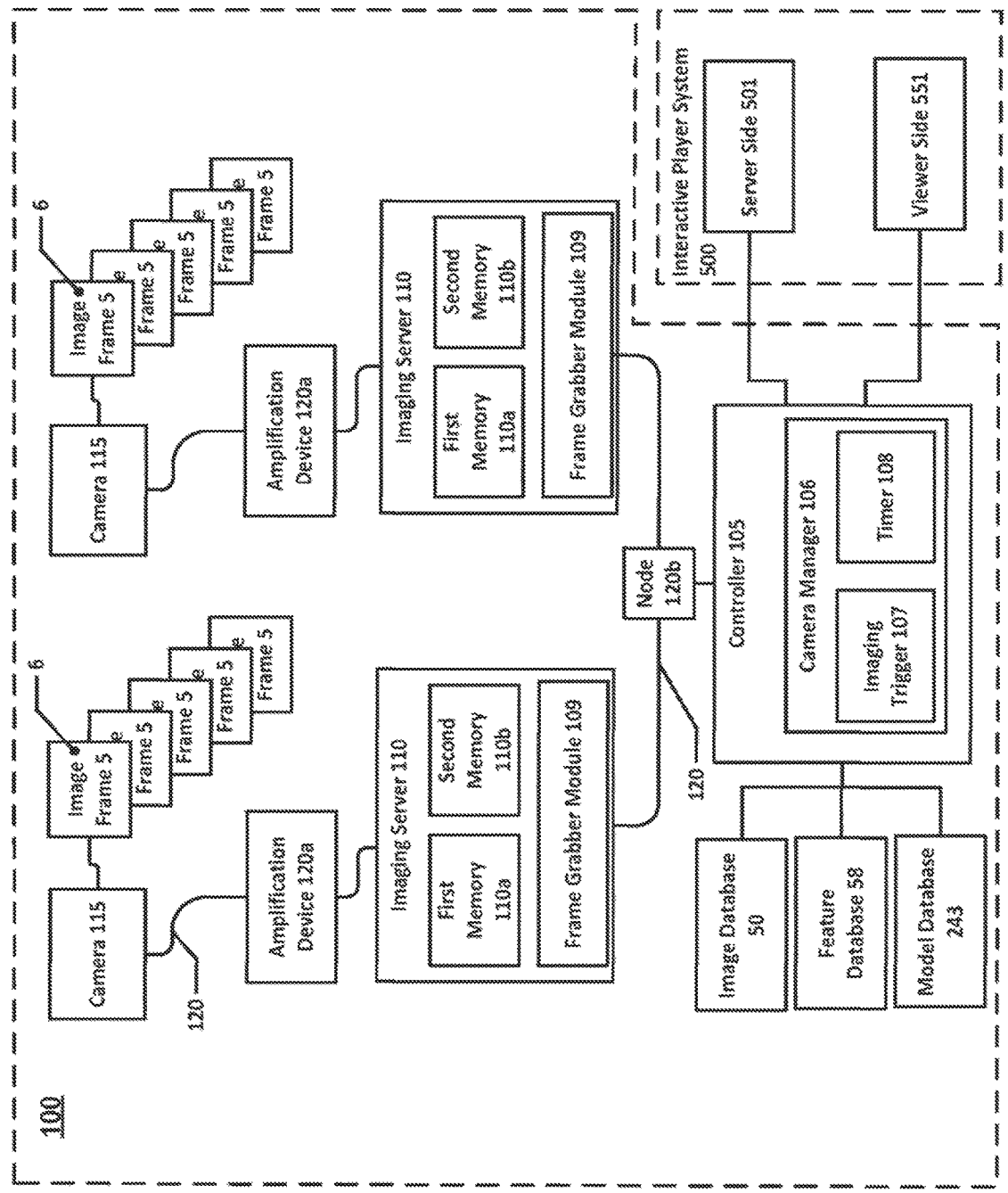
FIG. 1A is schematic view of an overview of a system for multi-view reconstruction in accordance with one or more embodiments of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Definitions

All technical and scientific terms shall have the same meaning as commonly understood by one of ordinary skill in the art. Nonetheless, the following terms are defined below to aid in the understanding of the disclosure and the definitions apply to all parts of speech of the term regardless whether the term is defined explicitly as such.

"About," "approximately," or "substantially similar" refer to a 10% variation from the nominal value. Even if not explicitly stated, it is to be understood that a variation is always included m a given value, whether or not the variation is specifically referenced.

"2D" means two dimensions and/or two-dimensional. Typically in this disclosure, 2D refers to an image having image data in a single two-coordinate plane and/or a reconstruction of image data lacking a third dimension, such as depth. "2D" may also refer to an image raster that is an array of pixels configured to an image or comprising an image; therein, each pixel has a grid position in a plane, e.g., XY positions, and RGB color space information.

"3D" means three dimensions and/or three-dimensional. Typically, in this disclosure, 3D refers to a physical non-virtual volume and/or a reconstruction of image data having a third dimension, such as depth. "3D" may also refer to a virtual space having three dimensions, e.g., a focal plane and a distance as measured at a right angle from the focal plane.

Forms of the verb "to capture" mean to (a) acquire image data of an object through one or more imaging sensor, such as a digital imaging sensor, and (b) save that image data to a file having any suitable format to any suitable memory storage.

"Computing device," or interchangeably "hardware," is intended in this disclosure for all purposes to be interpreted broadly and is defined for all uses, all devices, and/or all systems and/or systems in this disclosure as a device comprising at least a central processing unit, a communications device for interfacing with a data network, transitory computer-readable memory, and/or a non-transitory computer-readable memory and/or media. The central processing unit carries out the instructions of one or more computer programs stored in the non-transitory computer-readable memory and/or media by performing arithmetical, logical, and input/output operations to accomplish in whole or in part one or more steps of any method described herein.

A computing device is usable by one or more users, other computing devices directly and/or indirectly, actively and/or passively for one or more suitable functions herein. The computing device may be embodied as computer, a laptop, a tablet computer, a smartphone, and/or any other suitable device and may also be a networked computing device, a server, or the like. Where beneficial, a computing device preferably includes one or more human input devices such as a computer mouse and/or keyboard and one or more human interaction device such as one or more monitors. A computing device may refer to any input, output, and/or calculating device associated with providing a virtual reality experience to one or more users.

Although one computing device may be shown and/or described, multiple computing devices may be used. Conversely, where multiple computing devices are shown and/or described, a single computing device may be used.

"Computer program," or interchangeably "software," means any set of instructions stored in a non-transitory computer-readable memory or non-transitory computer-readable media for executing one or more suitable functions and/or for executing one or more methods in this disclosure. Even if not explicitly mentioned, in this disclosure, a computing device includes software having any set of instructions stored in non-transitory computer-readable memory or non-transitory computer-readable media for executing one or more suitable functions and/or for executing one or more methods in this disclosure.

"Mask" or "mask model" means one or more data representations that when placed over an image remove the portion of the image.

"Non-transitory computer-readable memory," or interchangeably "non-transitory computer-readable media," may be a hard drive, solid state drive, compact disk drive, DVD drive, and/or the like for storing the one or more computer programs.

A "photo-realistic rendering" means replay to the quality delivered to television broadcast; e.g., at least 720 pixel resolution. A "photo-realistic rendering" may also refer to one or more image frames in one or more sequences comprised of novel camera views, each view rendered as an extrapolation of pixels of a 3D data representation with color and occlusion information in such a way that there is less than 10% discrepancy between the output pixel raster values of the novel view images and the ground truth images. Therein, the ground truth images are produced directly from the imaging sensors, and preferably are image frames, as discussed below.

More particularly, whether a novel view is a "photo-realistic rendering" may also be determined using an RMS Based Photorealism Determination Process:
 1. An image of a scene, which may be any suitable scene, is grabbed.
 2. A novel view, i.e., an image, of the same scene as in the grabbed image, mimicking the intrinsic and extrinsic attributes of the camera which grabbed the image in step 1, is created using one or more algorithms including image resolution.

3. Differences between the grabbed image and the novel view are determined using exhaustive RMS comparison, as follows:
   a. The entire area of the grabbed image and the entire area of the novel view are each divided into at least 100 evenly spaced sections. The area of the grabbed image, the area of the novel view, and each section are measured in pixels and should be at least one pixel in size. The sections must be identical in both the grabbed image and the novel view, and sections from both images that are located in same pixel offset shall be considered corresponding.
   b. A pixel-wise RMS comparison is performed in ROB color space between a corresponding section in the real grabbed image and a section in the novel view by calculating $RMS=(!Rm-Rgl/\!2+!0m-Ogl/\!2+!Bm-Bgl/\!2)^{"}0.5$, where R,O,B represent ROB values, Xm denotes manufactured image pixel value and Xg represents grabbed image pixel value.
   c. The RMS values are linearly normalized so that a distance between pure white and pure black shall be 1.
   d. The RMS values are summed for all the pixels within a section and then the sum in the area of the section is divided so that the result between a pure white and a pure black section shall be 1.
   e. The highest result is selected from all comparisons of all sections.

4. Photorealistic quality is achieved when the result of the exhaustive RMS comparison is less than 0.1 (10%).

"User" means one or more individuals, persons, and/or groups who may have a need, desire, or intent to one or more system and/or methods in this disclosure in whole or in part. A user of one or more features of this disclosure need not necessarily be the same user or a related user of one or more other features of this disclosure. Moreover, a user of one feature may not be aware of another user of the same or a different feature. Where one user is shown and/or described, multiple users may be present. Where multiple users are shown and/or described, a single user may be present. Although it is preferred for a variety of reasons that one user or one group of users execute the one or more steps described herein, this disclosure should not be considered limited without such a switch in the identity of the users being explicitly described. Thus, where one user or users is described as performing a step or a portion of a step, another user or users may perform a subsequent or previous step or a subsequent or previous portion of the step performed by the other user or users.

A user may be a person who is "watching a photo-realistic rendering." In a traditional video, a user-viewer views the video from pre-determined views that coincide with view fields from one or more cameras. In contrast, watching a photo-realistic rendering means that the user-viewer interactively chooses novel views, which are not necessarily coincident with view fields from one or more cameras.

Where appropriate, other terms and concepts are defined elsewhere in the disclosure. The omission of such definitions from this section shall not be construed that the terms and concepts have not been properly defined for any intended purpose.

System for Multi-View Reconstruction

Figure 1C:
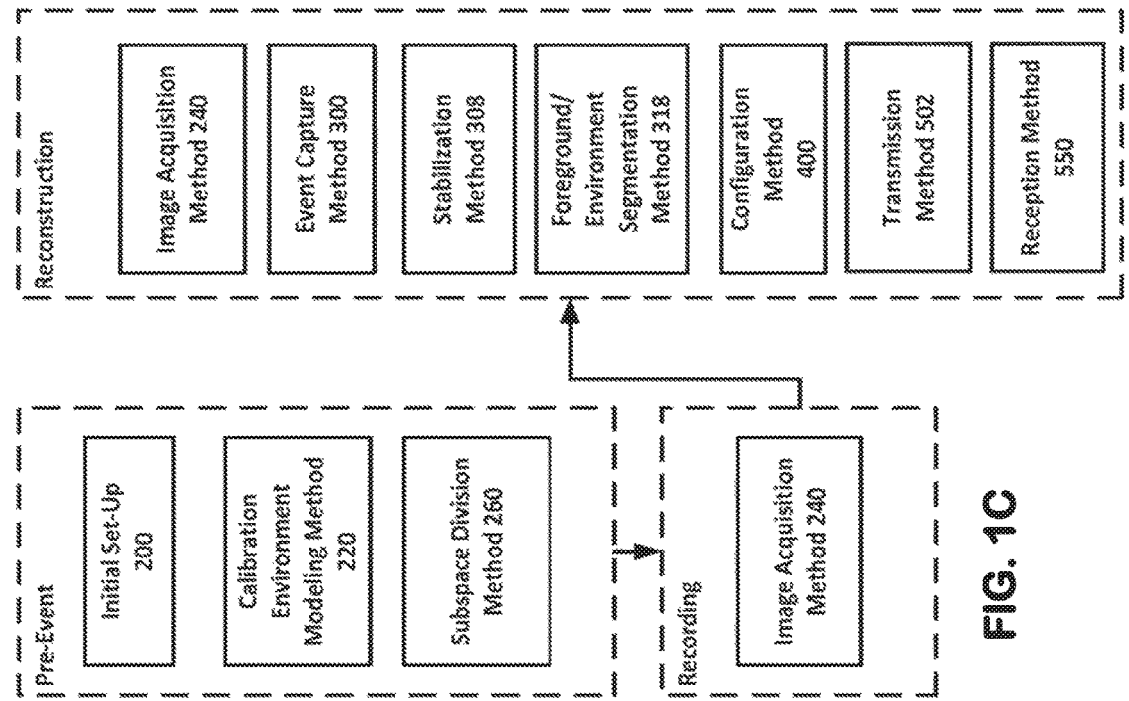
FIG. 1C is an overview of a plurality of methods operating at least in part on the system of FIG. 1A in accordance with one or more embodiments of the present invention.
Figure 1B:
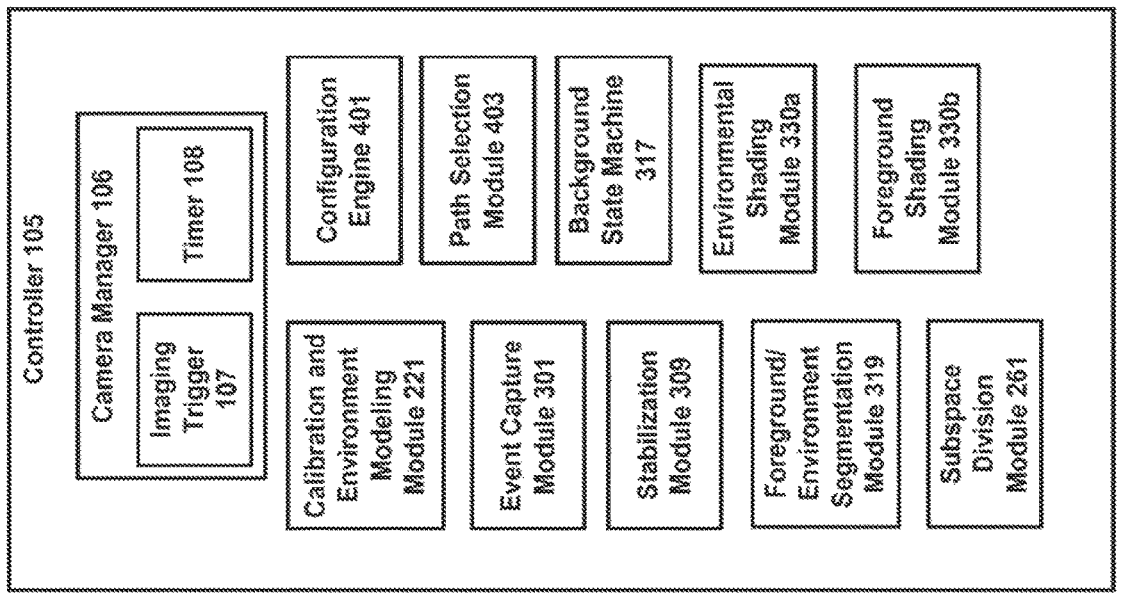
FIG. 1B is a schematic view of a controller of the system of FIG. 1A in accordance with one or more embodiments of the present invention.

FIG. 1 is schematic view of an overview of a system for multi-view reconstruction in accordance with one or more embodiments of the present invention. FIG. 1B is a schematic view of a controller of the system of FIG. 1A in accordance with one or more embodiments of the present invention. FIG. 1E is an overview of a plurality of methods operating at least in part on the system of FIG. 1A in accordance with one or more embodiments of the present invention.

Figure 2A:
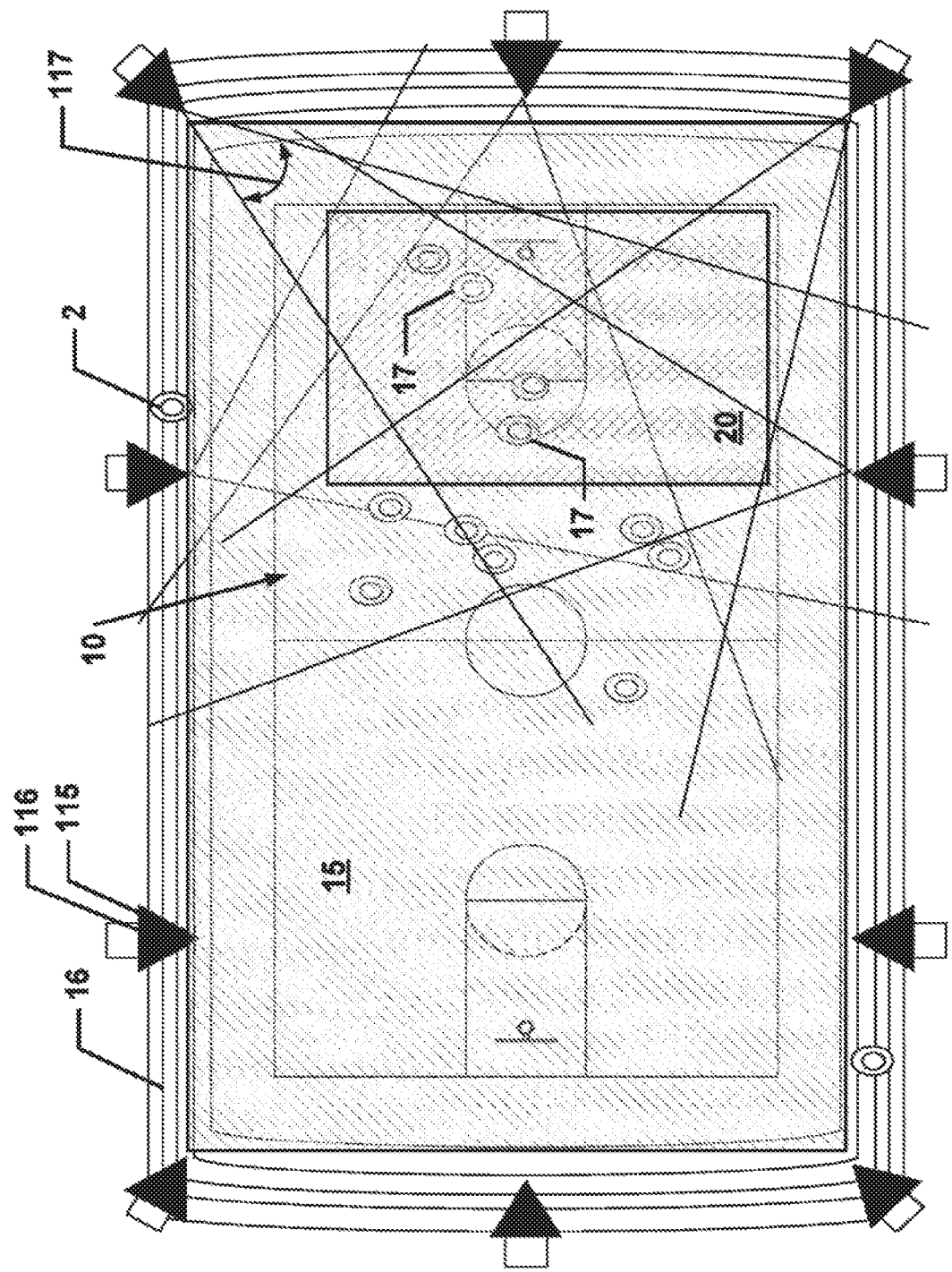
FIG. 2A is a plan view of an event in an event space in accordance with one or more embodiments of the present invention.
Figure 2C:
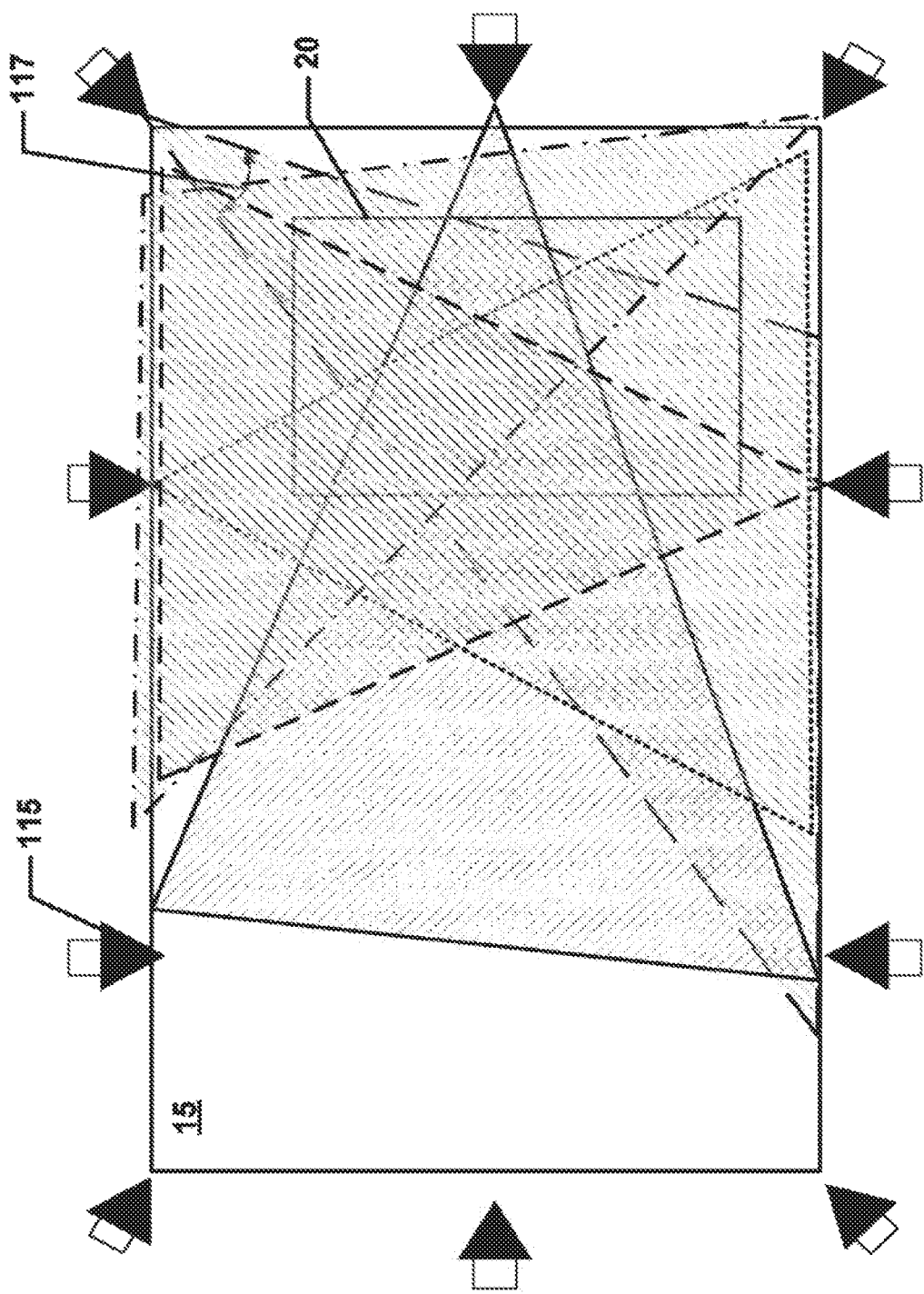
FIG. 2C is a plan view of overlapping view fields of selected cameras in the event space of FIG. 2A.
Figure 3:
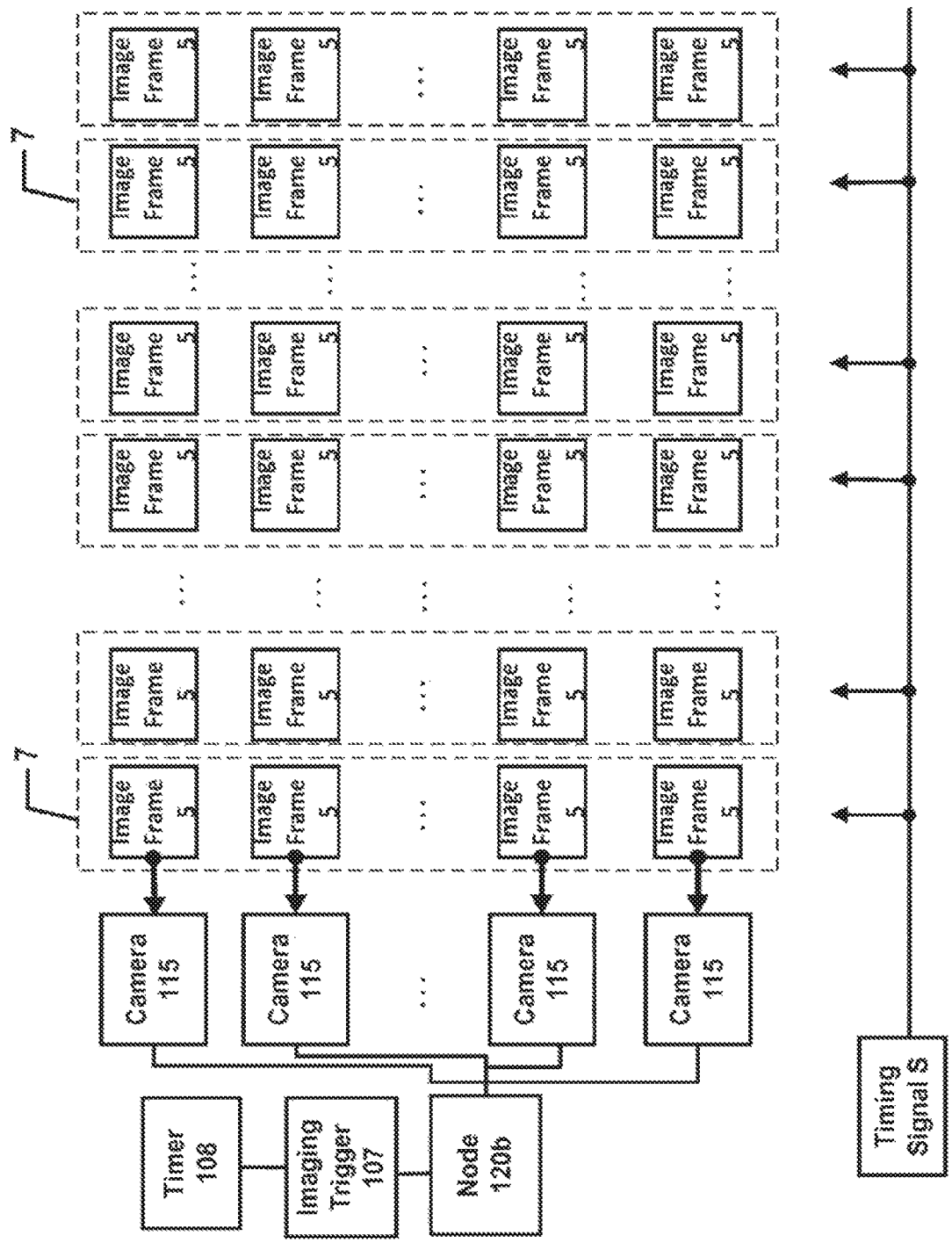
FIG. 3 is a schematic view of an imaging trigger, a timer, and a plurality of cameras capturing image frames/in accordance with one or more embodiments of the present invention.

FIG. 2A is a plan view of an event in an event space in accordance with one or more embodiments of the present invention. FIG. 2B is an elevational view of a portion of the event and event space in FIG. 2A. FIG. 2C is a plan view of overlapping view fields of selected cameras in the event space of FIG. 2A. FIG. 3 is a schematic view of an imaging trigger, a timer, and a plurality of cameras capturing image frames in accordance with one or more embodiments of the present invention.

In accordance with one or more embodiments of the present invention, a system 100 is used to record one or more portions of an event 10 occurring in an event space 15, calibrate image data 6 from image frame segment a foreground 17 from an environment 16 of event 10, reconstruct the record portion or portions of event 10, render the reconstruction with a photo-realistic output that effectively solves occlusion and color issues comprising novel views 66.

Specifically, system 100
records captures a plurality of synchronous image frames 5,
extracts image data 6 from image frames 5,
reconstructs image data 6 into at least one environment model and at least one foreground model; and
renders the models in a replay 64 comprising one or more user-selective novel views 66 having photo-realistic qualities.

In accordance with one or more embodiments of the present invention, a multi-view reconstruction system 100 comprises a controller 105, one or more imaging servers 110, and a plurality of cameras 115 that are interconnected by a plurality of communications links 120 with controller 105 and/or at least one server 110.

Controller 105 may be any suitable computing device that provides control of system 100, permits functional control of any method for one or more users. Preferably, system 100 comprises a single controller 105 to effectively control the entire system by one or more users.

As necessary and as understood in the art, controller 105 may comprise, as needed even if not explicitly described, one or more human interface devices whether these are physically embodied or virtual. A human interface device may be one or more monitors, keyboards, video jog devices, video or image play control devices and/or any other suitable device now know or yet to be developed.

Controller 105 may comprise one or more separate control servers (not shown), which are each configured as one or more computing devices. Therein, a first control server is used for launching one or more modules and/or transferring and/or handling data between one or more cameras 115 and one or more servers 110 (described below), i.e., the imaging servers. The first control server may also comprise and/or consist of the one or more servers 110 that are preferably but not necessarily integrated in the first control server. A second control server (not shown) is used as a camera manager 106, which may have any suitable interface, but preferably comprises or consists of a graphical user interface for permitting a user to easily and efficiently select actions or view data 20 or other information.

Although a single user is strongly preferred, multiple users may also use controller 105 and/or camera manager 106. For example, a "navigator" user may perform pre-event and post event procedures, assures that system 100 are technically functional, and resolves any instability issues, while a "pilot" user operates camera manager 106 and, for example, provides the human interaction for image grabbing related steps, frame selection, and camera path selection/creation.

In accordance with one or more embodiments of the present invention (a first server-memory embodiment), server 110 may be any suitable computing device having one or more memories for storing one or more data of system 100. Preferably, server 110 comprises at least a first memory 110*a* for storing a cyclic buffer of captured image frames 5 received from camera 115 and a second memory 110*b* for storing a plurality of image frames 5 that have been grabbed from first memory 110*a*.

In accordance with one or more embodiments of the present invention (a second server-memory embodiment), each server 110 may be any suitable computing device comprising at least two first memories 110*a*, each of which preferably is a random access memory, and one or more second memories 110*b*, each of which preferably is a solid state drive. One first memory 110*a* stores a predetermined amount of image data, e.g., one minute of image data in a raw image file format, cyclically, e.g., first in, first out. Once a grab related command, e.g., begin-grab command 106 (described below), occurs, server 110 transfers the image data to the one or more second memories 110*b*. Another first memory 110*a* may be used for segmentation, reconstruction, configuration, and rendering as described herein.

In accordance with one or more embodiments of the present invention, server 110 may also be configured so that one first memory 110*a* continuously writes, i.e., streams, image data in a raw image file format to the one or more second memories 110*b*. Another first memory 110*a* may be used for segmentation, reconstruction, and configuration and rendering as described herein.

In accordance with one or more embodiments of the present invention, each camera 115 is operable with one server 110 reserved only for that camera. That is, each camera 115 is in a one-to-one relationship with a server 110 dedicated only to that camera 115. Advantageously, a one-to-one relationship between one camera and one server permits a balanced network architecture that avoids one or more network problems such bandwidth chokepoints or avoids processing chokepoints. However, server 110 may be configured as a central data server comprising a plurality of data accessible memories, for example, a RAID-configured server.

A camera manager 106 executes on controller 105 to monitor and control servers 110, cameras 115, and communications links 120. Camera manager 106 may be embodied as physical computing device in or associated with controller 105, but preferably is software executing in controller 105 to allow for ease of adding one or more functions.

Camera manager 106 may have any suitable interface, but preferably comprises or consists of a graphical user interface for permitting a user to easily and efficiently select actions or view data or other information. Within the graphical user interface, within the camera manager 106 but not within the graphical user interface, or separately from the camera manager, the camera manager further comprises one or more real or virtual monitors or screens for viewing and/or following event 10 from a camera separate from cameras 115; selectably viewing one or more images captured from one or more cameras 115; and/or selectably viewing one or more status indicators of one or more cameras 115, servers 110, and/or communications links 120.

Camera manager 106 may also include an imaging trigger 107 for initiating the capture of synchronous image frames 5 of event space 15. Imaging trigger 107 may be embodied as a physical computing device in system 100 or associated with any other computing device, but preferably is software executing in controller 105 to allow for ease of adding one or more functions. One or more status indicators of imaging trigger 107 may also be incorporated within the graphical user interface, within the camera manager 106 but not within the graphical user interface, or separately therefrom as one or more displays 105.

Imaging trigger 107 includes a timer 108 for generating a periodic timing signal at one or more regular intervals and issuing the periodic signals in an instruction set to the one or more cameras 115 to capturing an image frame 5, synchronously among all cameras 115 receiving the instruction set.

Timer 108 may be any suitable timer, but preferably is a logic controller timer, a digital chip timer, or a clock oscillator capable of generating one or more signals every second and may comprise on more suitable transmitting devices capable of issuing the periodic signals in an instruction set. Timer 108 may generate a unique and/or sequential identifier that accompanies one or more timing signals in the instruction set. Thus, for example, an instruction set may comprise a timing signal, one or more instructions to each camera 115 to generate an image capture, i.e., an image frame 5, and a unique and/or sequential identifier associated with that specific timing signal. However, an instruction set may consist solely of a pulse signal that does not vary among signal generations, and, therein, cameras 115 automatically capture an image frame 5.

Associated with camera manager 106 and imaging trigger 107 is a frame grabber module 109 executing as software one or more, but preferably all, servers 110 to store image frames 5 captured by cameras 115 in one or more memories of server 110.

Although each camera 115 of the plurality of cameras may be a different type of camera, preferably, all cameras 115 are the same type of camera and comprise any suitable digital imaging device. Camera 115 comprises a lens having a fixed or adjustable focus; an imaging sensor having any suitable resolution for acquiring one or more image data 6; a computing device for interacting with the imaging sensor and being able several times per second to capture image data 6 in the form of an image frame 5 saved in any suitable format to any suitable memory storage; and any suitable communications interface for establishing and maintaining communications between camera 115 with controller 105 and/or server 110.

Preferably, image frame 5 is saved in a raw image file format that preserves the imaging sensor's digital data, i.e., a "raw" pixel information or digital negative. It is preferred, but not a limitation, that the resolution of image frame 5 varies and may range from 3840×2160 to 5120×3072. Resolution is quoted herein as width pixels×height pixels.

In accordance with one or more embodiments of the present invention, camera 115 may be a 4K camera, which is known in the art generally as a camera having a horizontal resolution of approximately 4,000 pixels. For example, camera 115 as a 4K camera may be an ultra-high definition camera having, according to the 4K industry standard, a resolution of 4096×2160 at a 19:10 or 1.9:1 aspect ratio and has an 8 megapixel imaging sensor, or a resolution of 4096×2304 using a 9 megapixel imaging sensor. In accordance with one or more embodiments of the present invention camera 115 may be a 5K camera, In accordance with one or more embodiments of the present invention, camera 115 may be a 5K camera, which is known in the art generally as a camera having a resolution of 5120×3072 using a 15 megapixel imaging sensor. In the alternative or in addition, camera 115 may be a 5K camera having an imaging sensor having 16 megapixels yielding a resolution of 5120×3072 at 30, 45, or 50 frames per second.

Indeed, camera 115 may be any suitable camera having any suitable input sensor now known or to be invented. Since camera sensor size and resolution increase each year, it is expected that camera 115 will utilize the most advanced commercially available cameras possible.

Camera 115 is located at a camera location 116 that is preferably disposed outside of event space 15 in a preferably fixed position and has a view field 117 fixedly directed toward one or more portions of event space 15 and, optionally, one or more portions of environment 16. In accordance with one or more embodiments of the present invention, camera 115 may also be movable, and, thus, have a movable view field 117.

At camera location 116 and having view field 117, camera 115 captures at least one or more image frames 5, which comprises image data 6 of event space 15 and, optionally, of environment 16. At least part of event space 15 and optionally, at least part of background is captured by at least two cameras 115, wherein each camera 115 has different and distinct view fields 117 of the same portion of event space 15 and/or the same portion of environment 16 by preferably being located at different and distinct camera locations 116, as for example shown with selected cameras 115 in FIG. 2C. A plurality of synchronously image frames 5 from different cameras 115 is an image frame set 7. One image frame set 7 may be "adjacent" to another image frame set 7 by being next in time.

In accordance with one or more preferred embodiments of the present invention, each camera 115 of a plurality of cameras 115 is a 5K camera having an imaging sensor comprising 16 megapixels having a 5120×3072 resolution capable of capturing at least 30 frames per second. Each camera 115 is disposed in a fixed, immovable camera location 116 and has an view field 117 of the same portion of event space 15 and/or the same portion of environment 16 to capture at least one or more image frames 5 of event space 15 and, optionally, of environment 16.

Communications links 120 may be any suitable device that places one or more cameras 115 in operable communication with controller 105 and/or one or more servers 110. Communications links 120 may be any suitable media capable of transferring video images at required bandwidth, such as but not limited to co-axial cable, wireless communications devices, infrared communications devices, and/or a combination thereof. Communications links 120 may include one or more amplification devices 120a that increase a range of the communications links and one or more nodes 120b that connect one or more communications links 120 together, especially a main node that is strategically placed to issue one or more timing signals.

In accordance with one or more preferred embodiments of the present invention, each camera 115 is connected via amplification device 120a that is a fiber extender to their respective server 110.

Although not shown, electrical power may be readily supplied from one or more sources to any portion of system 100 as needed and/or as desired.

Any necessary and desired geometric measurements, such as obtaining one or more reference height data of the environment, may be obtained by direct measurement and/or any other suitable means.

Communication among one or more components of system 100 and especially with one or more cameras 115 may be achieved using any suitable communication protocols. For example, the communication protocol may be the Camera Link standard as maintained by the Automated Imaging Association and specifically may be the Camera Link 2.0 standard released in November 2011.

Pre-Event
Initial Set-Up

Figure 4:
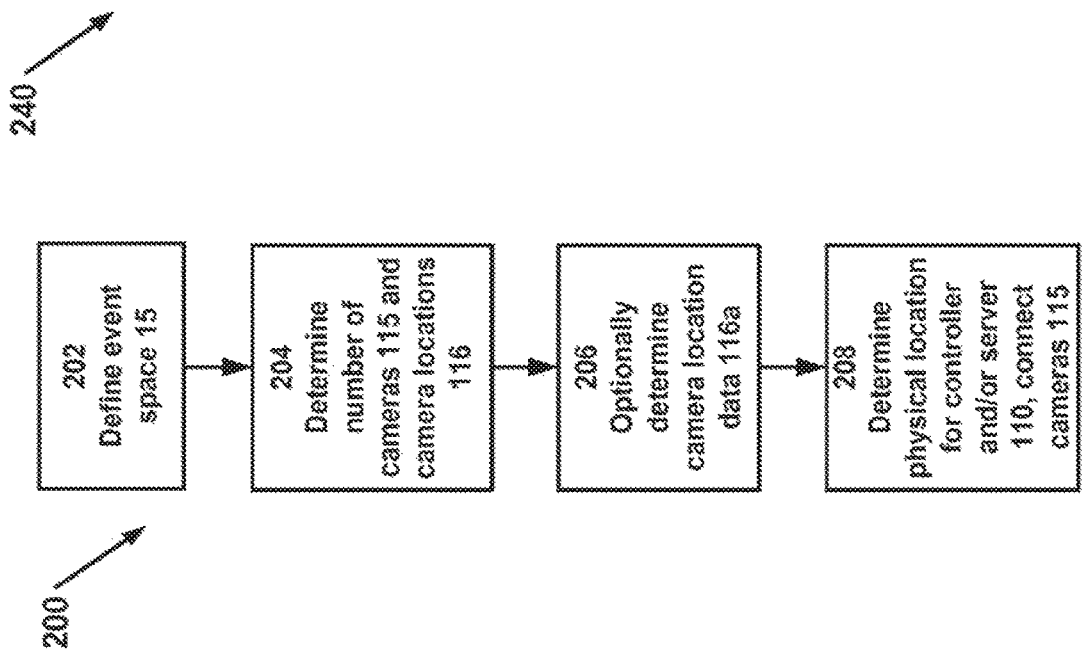
FIG. 4 is a schematic diagram of an initial set-up method in accordance with one or more embodiments of the present invention.

FIG. 4 is a schematic diagram of an initial set-up method in accordance with one or more embodiments of the present invention.

In accordance with one or more embodiments of the present invention, one or more users perform an initial set-up method 200 of system 100. Initial set-up method 200 comprises one or more steps 202-208.

The initial set-up method is performed when it is determined that event 10 that is occurring in an event space 15 is desired to be captured for configuring and rendering from novel views. Event 10 may be any suitable event occurring in the physical universe. Although, event 10 may include computer generated imagery (CGI), as for example a CGI being shown on a screen of a display device, event 10 in and of itself is not CGI. Therein, event 10 is distinguished from CGI by comprising at least one tangible volumetric object, i.e., a physical object occupying three-dimensional space.

Although, the novel views comprise, broadly, computer generated imagery. However, pre-event volumetric reconstruction of the background and live event volumetric reconstruction of the foreground in and of itself is not CGI but rather photo-realistic rendering based on underlying images of physical universe of event 10.

Event space 15 may be any suitable space. For example, event 10 may be a football, baseball, or soccer game having a plurality of players that occurs in an event space 15 of a playing field in a stadium. Event 10 may also be a yoga teaching session occurring in an event space 15 of an indoor yoga studio. Event 10 may also be a surgery occurring in an operating room in a hospital. Event 10 may also be the regular pedestrian traffic in an event space 15 of a plaza in a town.

Initial set-up method 200 may be performed only once; for example, when event space 15 of the yoga studio is first contemplated to be used to show a yoga guru's postures during regular lessons. However, initial set-up method 200 may be performed multiple times; for example, a stadium may host multiple types of sports events and the event space 15 of the playing field changes depending on type of sport.

Initial set-up method 200 preferably begins with a step 202 by a user to define, i.e., determine, event space 15 in which one or more events 10 that are to be captured and reconstructed by system 100 will occur. Event space 15 preferably comprises a regular three-dimensional geometric shape, but may be any convenient three-dimensional shape.

Step 202 may also include defining, i.e., determining, by the user the extent to which an environment 16 that will be captured. Environment 16 preferably includes one or more marginal three-dimensional spaces or one or more marginal areas around event space 15 that are necessary or desirable to be included in a reconstruction of event 10. Environment 16 may be any convenient shape and is not limited to a regular or irregular two-dimensional or three-dimensional geometric shape.

Environment 16 differs from foreground 17 in that environment 16 comprises or consists of one or more elements that are static and foreground 17 comprises or consists of one or more elements that are dynamic, i.e., moving. Typically, but not limited thereto, environment 16 may be substantially static elements in event space 15 and may be seating, floor, tables, benches, ground, ground markings such as football yard markings, buildings, static or dynamic advertising, fountains, umpire chairs, roof joists, roof, lights, chandeliers, team dugouts, flags, goals, goal posts etc.

For example, if event 10 is a sports event, such as a volleyball game, event space 15 may be defined as the three-dimensional space that encompasses a portion or the entire field of play, i.e., the pitch plus a portion of the touch lines, extending one or more distances above the field of play. Event space 15 need not include the surface of the pitch itself and may be shaped to be higher in midfield where volleys over the net would be expected and be lower in other areas where passes are more targeted. Environment 16 may include one or more portions of the spectator area, trainer area and/or the pitch.

However, it should be understood that at item may be part of environment 16, but at a later time become part of the foreground. For example, the seating may part of environment 16 at the beginning of a sporting event. At some point during the sporting event, a player or a coach in a fit of anger takes the seat and throws it onto the field of the sporting event. Since such an event would be of interest in system 100, novel view images of foreground 17, for example, would include the seat as it is being thrown as part of the foreground 17 and not environment 16.

In a step 204, the user determines the number of cameras 115 that will be necessary or are desired to capture event space 15 and/or environment 16. The user then determines at least one camera location 116 for each camera 115. After selecting the camera location and physically mounting the camera, the user orients camera 115 to have view field 117 to capture one or more portions of event space 15 and/or environment 16. Preferably, the camera is located such that it is in an unobtrusive position relative to event space 15. For example, if the event space 15 is a sports event, the camera locations 116 may be on the infrastructure of the stadium, e.g., a beam or a column, and view fields 117 are of the field of play.

To effectively capture a foreground element, preferably, it must be captured by at least three cameras that are disposed adjacent to each other in sequence, i.e., a particular element of foreground 17 is preferably captured by three cameras 115 that are disposed in camera locations 116 that are sequentially adjacent to each other. In contrast, a particular element of environment 16 may be captured by only one camera 115 (wherein only manual reconstruction of volume is possible in that area) but preferably two or more cameras 115 image a particular element of environment 16.

Step 204 may include re-defining event space 15 and/or environment 16 in view of one or more constraints such as the physical limits of the infrastructure proximal to the event space.

In a step 206, optionally, camera location data 116a is determined for all cameras 115 using data from a Global Positioning System (GPS) receiver, which may be incorporated in one or more cameras 115.

Camera location data 116a comprises spatial position data for each camera 115 (or more preferably for a center point of the imaging sensor of camera 115) relative to a reference point, which may be an absolute reference point or a local reference point, selected to be common for all cameras 115. For example, the spatial position data may be expressed in X, Y, and Z coordinates relative to the reference point selected for all cameras 115.

Camera location data 116a further comprises imaging direction data for each camera (or more preferably for the center point of an imaging sensor of camera 115). The imaging direction data may be relative to the camera's (or imaging sensor's) spatial position data and, thus, for example be Euclidean geometry line describing the imaging direction in spatial position data. However, the imaging direction data may also be described as Euler angles or Tait-Bryan angles, i.e., yaw, pitch, and roll, with reference to the spatial position of the camera (or the imaging sensor). Camera location data 116a is stored in one or more memories 110c of server 110 or in any other suitable storage and may be stored in any suitable data form. For example, camera location data 116a may be stored as a camera projection matrix, i.e., camera matrix 233, along with data about camera 115 such as sensor, raster, and depth information.

Preferably, cameras 115 are placed and/or camera locations 116 are chosen according to one or more considerations. A camera 115 should be placed and/or camera location 116 chosen so that there is no more than a 30 degree absolute (i.e., three-dimensional) arc on the triangle generated between sequential cameras to the center point of event space 15, i.e., the coverage area. A camera 115 should be placed and/or camera location 116 chosen so that there is no more than 30 absolute (three dimensional) arc on the triangle generated between cameras 115 immediately physically adjacent and the closest point that is considered "foreground to be reconstructed" and the cameras. Each event space 15, i.e., coverage area, that is considered foreground 17 should be imaged by at least three sequential cameras.

For example, for a sporting event, the angle between two cameras 115 to the center of the field is no more than 20 degrees (preferably 16 degrees to deal well with occlusions), and no more than 30 degrees between the two cameras to a closest edge of the field in relation to these cameras.

In accordance with one or more embodiments of the present invention, camera location data 116a may be determined from one or more image frames 5, as further described in this disclosure.

In a step 208, the user determines a suitable physical location for controller 105 and/or server 110 and locates the controller and server there. The user then connects cameras 115 via one or more communications links 120 to controller 105 and/or server 110.

In accordance with one or more embodiments of the present invention, step 208 may be performed by connecting one or more cameras 115 via newly provided communications links 120 and/or existing communications network, such as the internet, RS232, LAN, WAN, to controller 105 and/or server 110 that have already been located in any suitable location.

In accordance with one or more embodiments of the present invention, step 204, 206, and 208 may have already been performed prior to step 202. Thus, step 202 may be performed by a controller 105 that automatically determines event space 15 and/or environment 16 to be captured based on imaging data received from the one or more cameras 115. For example, system 100 may be used in a security application to determine activities occurring in a public space, such as a square or plaza. Thus, in steps 204, 206, and 208, cameras 115 have been positioned during a general infrastructure upgrade and camera location data 116a have been determined and stored using survey data. Therein, one or more cameras 115 are used to determine where activity, i.e., event 10, occurs in the public space and event space 15 is defined relative to the occurrence of the activities. Thus, for example, not all cameras 115 used in subsequent steps would be used in order to save on processing power, network capacity, and/or any other suitable reason.

Pre-Event Camera Calibration and Environment Modeling

Figure 5:
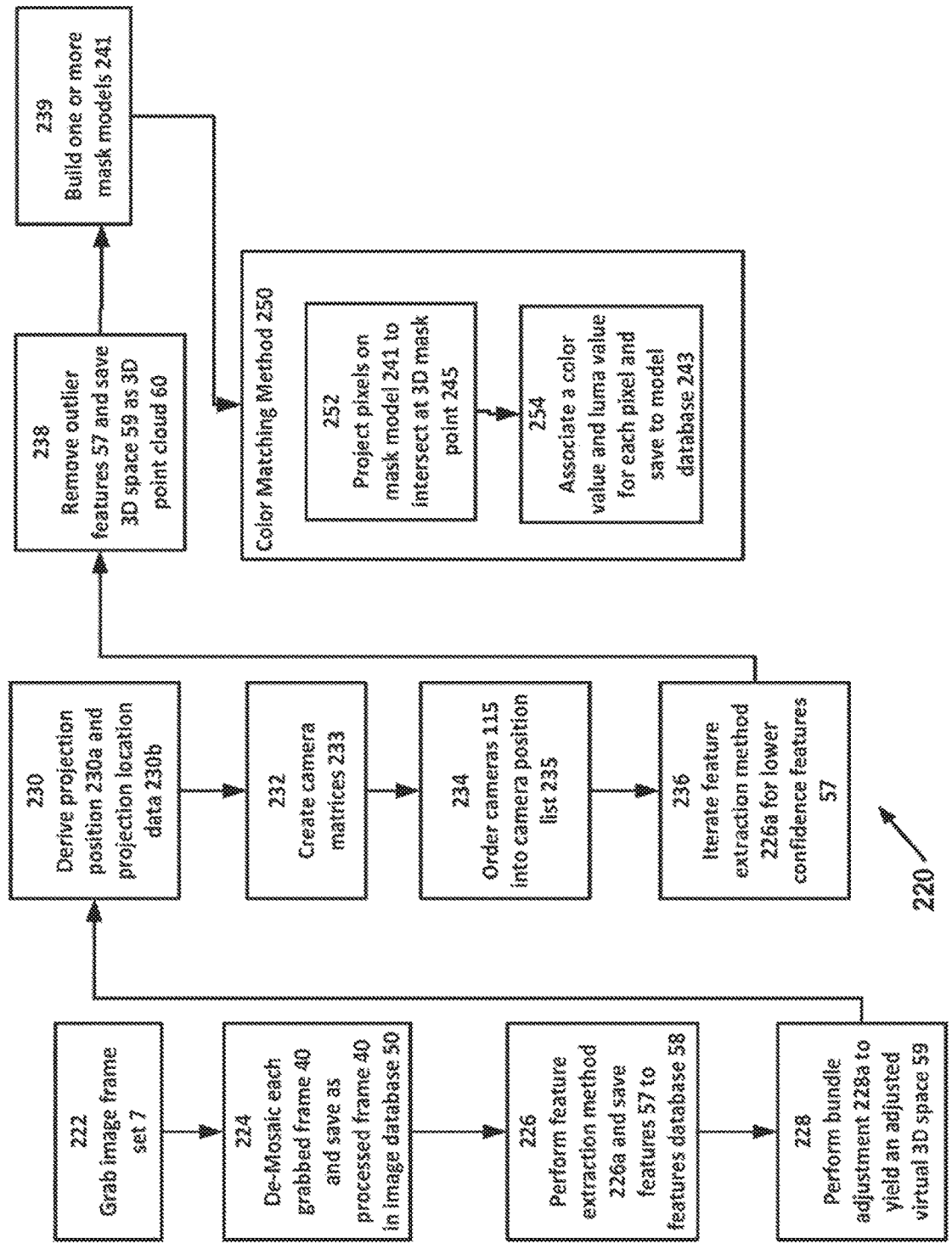
FIG. 5 is a schematic diagram of calibration and environment modeling environment method in accordance with one or more embodiments of the present invention.

FIG. 5 is a schematic diagram of a calibration and an environment modeling (CEM) method in accordance with one or more embodiments of the present invention.

In accordance with one or more embodiments of the present invention, prior to event 10 occurring, i.e., "pre-event," a user utilizes a calibration and environment modeling (CEM) module 221 of system 100 to execute a CEM method 220 comprising one or more steps 222-239, and of which one or more steps are preferably performed in the numerical sequence provided herein.

CEM method 220 preferably executes on CEM module 221 to create an environment model 223 used in subsequent reconstruction of environment 16 associated with event 10. Environment model 223 may be understood to be the background 3D model or the background data representation. CEM method 220 is preferably performed prior to capturing image frames 5 of event 10. CEM module 221 may be embodied as a physical computing device in system 100 or associated with any other computing device, but preferably is software executing in controller 105 to allow for ease of adding one or more functions.

Therein, the environment is preferably modeled during the pre-event, while the foreground, which typically constitutes the action, is modeled during the event.

CEM method 220 determines for each camera 115 a respective camera location data 116a relative to other camera locations and saves that information in a camera database 52 (as further described below) and develops a sparse environment model based on features which "survive" a bundle adjustment. The calibration method significantly includes grabbing image frames and significantly includes de-mosaicing and into a color image file to obtain features that are then matched to each other between cameras. In the alternative, the raw image may be used to obtain features that are then matched to each other between cameras.

In a step 222, after performing initial set-up method 200, the user initiates CEM module 221 to grab at least one image frame set 7 of synchronous image frames 5 from cameras 115 to database 50 to capture environment 16.

CEM module 221 may use any suitable method to obtain and save synchronous image frames 5 from cameras 115 to database 50. However, preferably, a method substantially similar to execute image acquisition method 240 is used and therein preferably without event 10, i.e. pre-event, occurring so that environment 16, especially the ground surface on which event 10 will occur, may be readily perceived.

In a step 224, each grabbed frame 40 is de-mosaiced and processed by CEM module 221 according to one or more de-mosaicing algorithms known in the art from the raw image file format to a formatted image file and is saved in image database 50. For example, each grabbed frame 40 is de-mosaiced and converted from a raw image file to a processed frame 40a of a .tiff image file or .jpg image file.

In a step 226, CEM module 221 executes a feature extraction method 226a. Therein, feature extraction method 226a extracts one or more features 57 from each processed frame 40a using one or more algorithms known in the art and saves features 57 to a feature database 58 associated with that processed frame 40a.

A feature is a pixel or set of pixels that is more prominent than one or more neighboring pixels within the processed frame 40a. Typically, features indicate image information related to processed frame 40a; the image information may be edge lines, shapes, or contours of a volumetric or non-volumetric object. In particular, features 57 indicate image information related to environment 16.

Features database 58 may comprise any useful information about features 57, but preferably include 20 coordinate of the feature within processed frame 40a, a reference identifier of processed frame 40a (which preferably is the same or a different reference identifier of image frame 5 associated with that processed frame 40a), scale, orientation, template, one or more feature parameters associated with use of a scale-invariant feature transform (SIFT) algorithm, Eigen value, usage frequency of the feature in configuring and rendering or bundle adjustments, one or more time stamps indicating the usage of one or more features 57, and/or a list of reference identifiers of processed frames 40a where the same feature 57 is found.

In a step 228, CEM module 221 performs a bundle adjustment 228a. Therein, a projection of each processed frame 40a is readjusted by CEM module 221 simultaneously with the other processed frames 40a in a bundle adjustment as is known in the art to achieve substantially a self-calibration of all the processed frames 40a in a virtual 30 space 59. The bundle adjustment preferably corrects for inadvertent movement of cameras 115, e.g., due to wind, vibration, adjacent movement, by distributing the inconsistencies between and among all processed frames 40a, e.g., cameras 115. The bundle adjustment also provides a basis, in conjunction with other modules, for determining camera locations and the "structure," i.e., matrix, of an environment model, which may be a sparse matrix that needs to be manually enhanced to make it a dense matrix, where sparse and dense are used synonymously with terms commonly known in the art.

Specifically, "pre event calibration" is achieved via bundle adjustment, and "live event stabilization/registration" is performed via a stabilization using for example, Lev Mar optimization.

Preferably, feature matching for bundle adjustment is performed by projecting one or more features 57 of at least two processed frame 40a into virtual 3D space 59 and calibrating the 3D positions of the one or more features 57 based on matching the same one or more features 57 in the projection of at least two processed frames 40. More particularly, features 57 of a plurality of processed frames 40a are matched in virtual 3D space 59.

In a step 230, CEM module 221 derives a normalized origin of the projection, i.e., a projection position 230a, of each processed frame 40a the geometric results of bundle adjustment 228a relative to virtual 3D space 59. A normalized origin may differ from an actual origin since the adjustment calibrates, i.e., distributes, an error in each projection origin according to one or more algorithms known in the art and does not determine the actual error for each camera. Moreover, since the projection position 230a is substantially proximal with the origin of the imaging sensor, CEM module 221 has determined at least the camera location of each camera 115 and correlates image data 6 from camera 115 with the respective projection position 230a in 3D space 59.

Therein, projection position 230a comprises projection location data 230b. Projection location data 230 comprises spatial position data in 3D space 59 for each camera 115 (or more preferably for a center point of the imaging sensor of camera 115) relative to a reference point, which may be an absolute reference point or a local reference points, selected to be common for all cameras 115. For example, the spatial position data may be expressed in X, Y, and Z coordinates relative to the reference point selected for all cameras 115.

Projection location data 230b further comprises imaging direction data for each camera (or more preferably for the center point of an imaging sensor of camera 115). The imaging direction data may be relative to the camera's (or imaging sensor's) spatial position data and, thus, for example be Euclidean geometry line describing the imaging direction in spatial position data. However, the imaging direction data may also be described as Euler angles or Tait-Bryan angles, i.e., yaw, pitch, and roll, with reference to the spatial position of the camera (or the imaging sensor).

In a step 232, CEM module 221 uses projection location data 230b to create one or more camera matrices 233 to describe for each camera 115 mapping image data 6 from 2D position of a processed frame 40a to a 3D position in 3D space 59.

Camera matrices 233 may be used in other steps to compensate for unintended camera movement in a stabilization method 308. That is, each camera matrix 233 defines a position of camera 115 (i.e., camera location data 116a), which is re-defined in the stabilization method 308 when camera 115 is in a position has moved due to a variety of factors, e.g., wind or pedestrian traffic affecting the superstructure to which camera 115 may be secured.

In a step 234, after camera matrices 233 are calculated, CEM module 221 orders cameras 115 into a camera position list 235 based on projection location data 230b so that cameras 115 that are physically adjacent are also adjacent in the camera position list 235.

In a step 236, CEM module 221 iterates a feature extraction method preferably substantially similar to feature extraction method 226a to extract and save further features 57 in proximity to features 57 found in step 226. Advantageously, only a few prominent features 57 are needed to calibrate cameras 115; thus, saving processing time and expense in order to make the system more quickly available and on-line.

However, in accordance with one or more embodiments of the present invention, in particular, after prominent features 57 have been extracted, further features 57 in proximity to the first found features but having a lower degree of confidence in the one or more extraction algorithm are extracted and saved to features database 58. CEM module 221 continues executing a feature extraction method to extract and save features 57 in proximity to features 57 found in the immediate prior iteration or any iteration. Each iteration has a statistically lower degree of confidence regarding the one or more extraction algorithm being used.

In a step 238, CEM module 221 uses principles of proximity, sparseness and similarity as are known in the art to remove outliers in features database 58 so that erroneous features 57 have been reduced when features 57 are projected in 3D space 59 to create a 3D data representation 60.

Therein, 3D data representation 60 may be in any suitable format; for example, a database or point list. In accordance with one or more embodiments of the present invention, 3D data representation 60 may be a 3D point cloud and/or a 3D point cloud database. However, 3D data representation 60 may be one or more representations of a point or facet of a regular or irregular 3D geometric figure and be one or more such 3D geometric figures and/or database of one or more such 3D geometric figures.

In accordance with one or more embodiments of the present invention, an interquartile range method preferably is used. Therein, if a 3D data point has an X, Y, or Z coordinate that is outside of the upper and lower quartile range, the 3D data point is removed. That is for data point having any coordinate a in a list where Q1 is first quartile and Q3 is the third quartile, the data point is eliminated if it meets one of the following conditions:

$a < Q1 - (Q3 - Q1) \times 1.5$ or $a > Q3 - (Q3 - Q1) \times 1.5.$

In a step 239, CEM module 221 builds one or more models 223 of environment 16. Each environment model 223 comprises one or more polygonal mesh fitted to at least a portion of 3D data representation 60 and saves the model, for example, in a model storage 225, which may be as a database or any other suitable format. Therein, all of environment 16 may be as few as one environment model 223 comprising one polygonal mesh or all of environment 16 may comprise a plurality of models 223, wherein each model comprises one or more polygonal mesh models. However, one portion of environment 16 may comprise one or more models 223, wherein each model comprises one or more polygonal mesh models. In addition or in the alternative, rather than using a mesh, a point cloud or a 3D data representation may be used.

In the alternative or in addition, a mask model 241 may be built using computer aided design and drafting. Advantageously, when environment 16 is well known, for example, a meeting room or a dance studio, environment 16 can be very accurately and quickly represented by architectural or design data.

Subspace Division

Figures 6, 9:
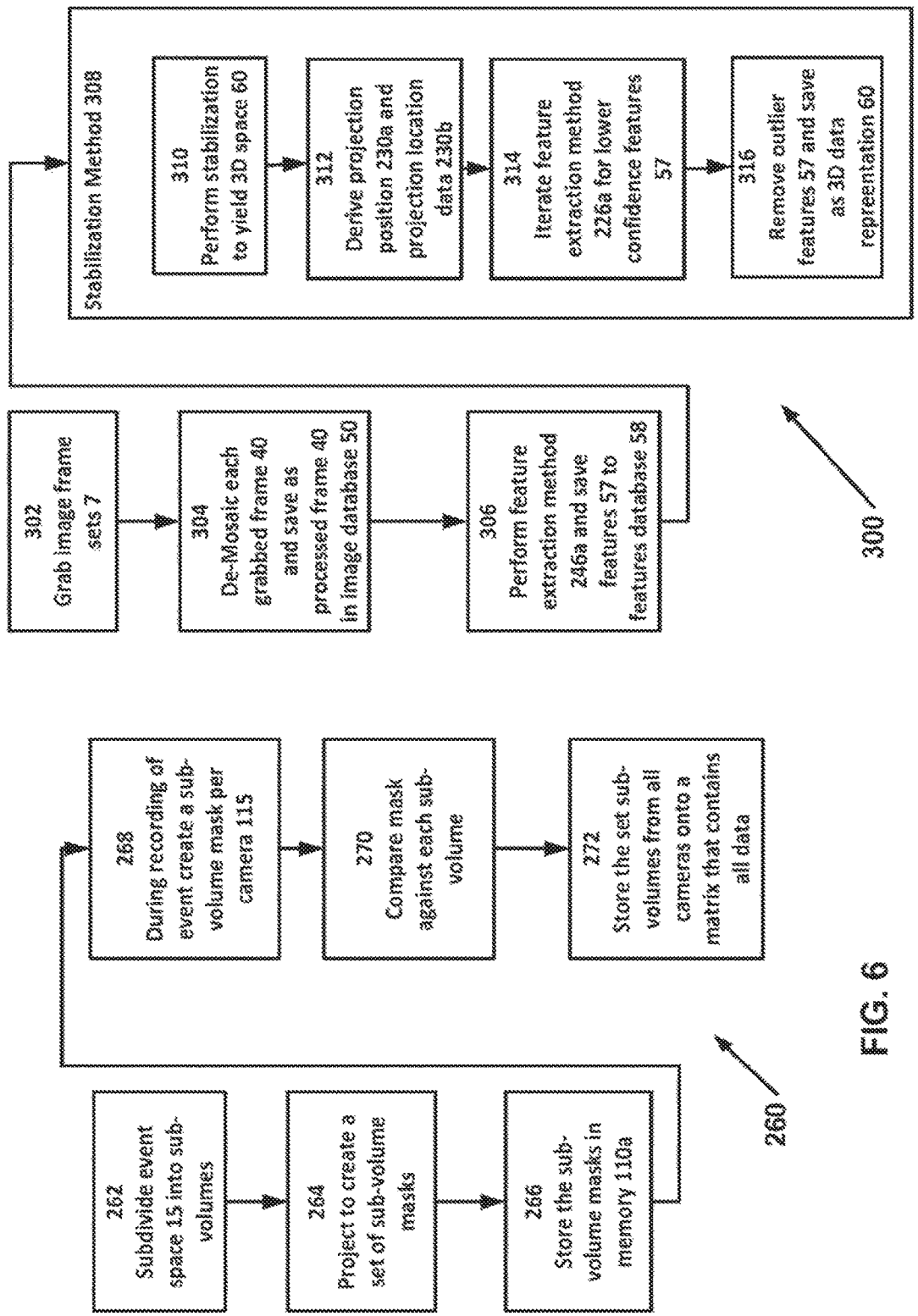
FIG. 6 is a schematic diagram of a subspace division method in accordance with one or more embodiments of the present invention.
FIG. 9 is a schematic diagram of an event capture method in accordance with one or more embodiments of the present invention.

FIG. 6 is a schematic diagram of a subspace division method in accordance with one or more embodiments of the present invention.

In accordance with one or more embodiments of the present invention, prior to event 10 occurring, i.e., "pre-event," a user utilizes a subspace division (SD) module 261 of system 100 to execute a subspace division (SD) method 260 comprising one or more steps 262-272 and of which one or more steps are preferably performed in the numerical sequence provided herein.

SD method 260 preferably executes on SD module 261 to create a database that is used in subsequent configuration, i.e., during the event, to speed up rendering and/or configuration of environment 16 associated with event 10 by avoiding reconstruction of the environment where the live event is not occurring within event space 15. Thus, SD method 260 is performed by SD module 261 preferably prior to capturing image frames 5 of event 10 and produces a database or data representation, e.g., run-length encoding (RLE) database 265, of the environment.

SD module 261 may be embodied as a physical computing device in system 100 or associated with any other computing device, but preferably is software executing in controller 105 to allow for ease of adding one or more functions. In accordance with one or more embodiments of the present invention, since the cube projection is convex, SD method 260 may advantageously use a run-length encoding (RLE) database as a storage format.

SD module 261 uses the entire set of images and entire pixel set in an image for recreating a 3D model. In the alternative or in addition, event space 15 may be subdivided into smaller spaces, i.e., sub-volume, such as cubes by SD module 261 executing a subdivision method. Thus, when each step of the reconstruction is performed only relevant sub-volume for 3D reconstruction is required resulting in significant reduction in processing time, by for example, having some processing occur prior to executing a configuration and rendering method, such as configuration method 400.

In step 262, in a pre-event, i.e., initial set-up, including determining by a user a volume of the event space and defining by a user the volume for a system, the system comprising the SD module; SD module 261 subdivides the relevant volume, typically event space 15, into a plurality of sub-volumes that are physically smaller than the relevant volume. At this point, the relevant volume comprises or consists solely of environment 16.

In a step 264, for camera 115, SD module 261 projects from each camera 115 each of the sub-volumes to create a set of sub-volume masks relative to each camera 115.

In a step 266, SD module 261 stores the sub-volume masks from each camera 115 in a first memory 110*a* of a server 110 associated with that respective camera 115.

In a step 268, during recording of the event by system 100, SD module 261 creates an imaging mask of event 10 per camera 115 for each sub-volume per imaging frame.

In a step 270, SD module 261 compares the imaging mask against each sub-volume mask and the results are determined such that extracted features 57 that overlap other sub-volumes or do not overlap the sub-volumes. SD module 261 then adds or saves each feature to create a resultant subspace division (SD) mask 263 that crops 3D data representation 60 from the imaging frames recorded in step 268.

In a step 272, SD module 261 stores the set of sub-volumes that have features 57 from all cameras 115 in a database preferably having a matrix that contains all data. Therein, the projection of a sub-volume, i.e., cube, onto a camera is always a single convex blob. Advantageously, it is very easy to describe it using a two-line run-length encoding (RLE) database 265. Several adjacent sub-volumes that are seen by the same cameras can be clumped back onto a single render so that the 3D reconstruction can be more efficient. Fill factor can be used to remove noise, clutter, and outside and inside background by translating how much "positive representation" constitutes a foreground presence. For example, a factor of 0.05% fill factor of positive (white) pixels in the specific rasterized facet of the cubes constitutes foreground, less is determined to be noise.

Recording

Image Acquisition

Figure 7:
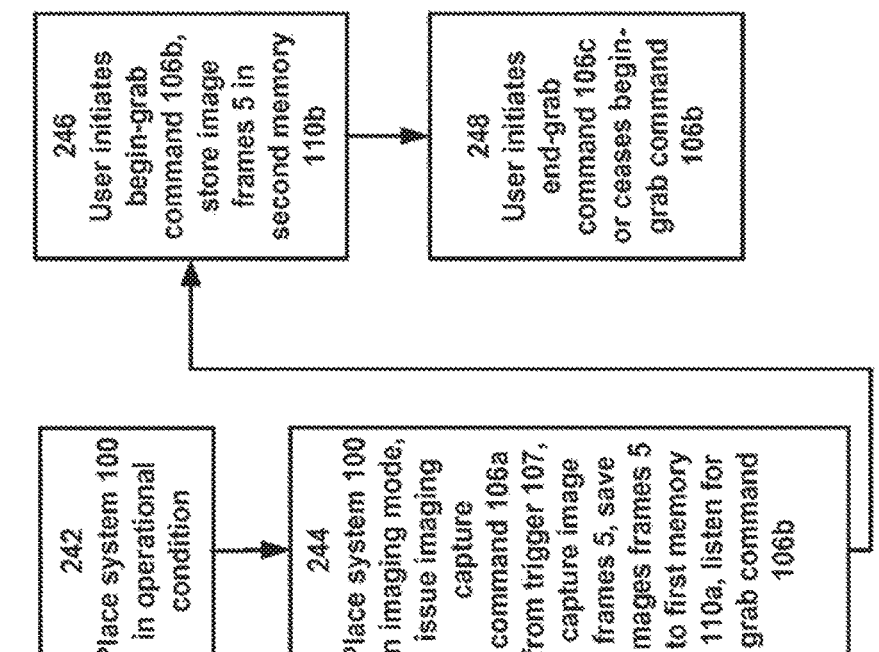
FIG. 7 is a schematic diagram of an image acquisition method in accordance with one or more embodiments of the present invention.
Figure 8:
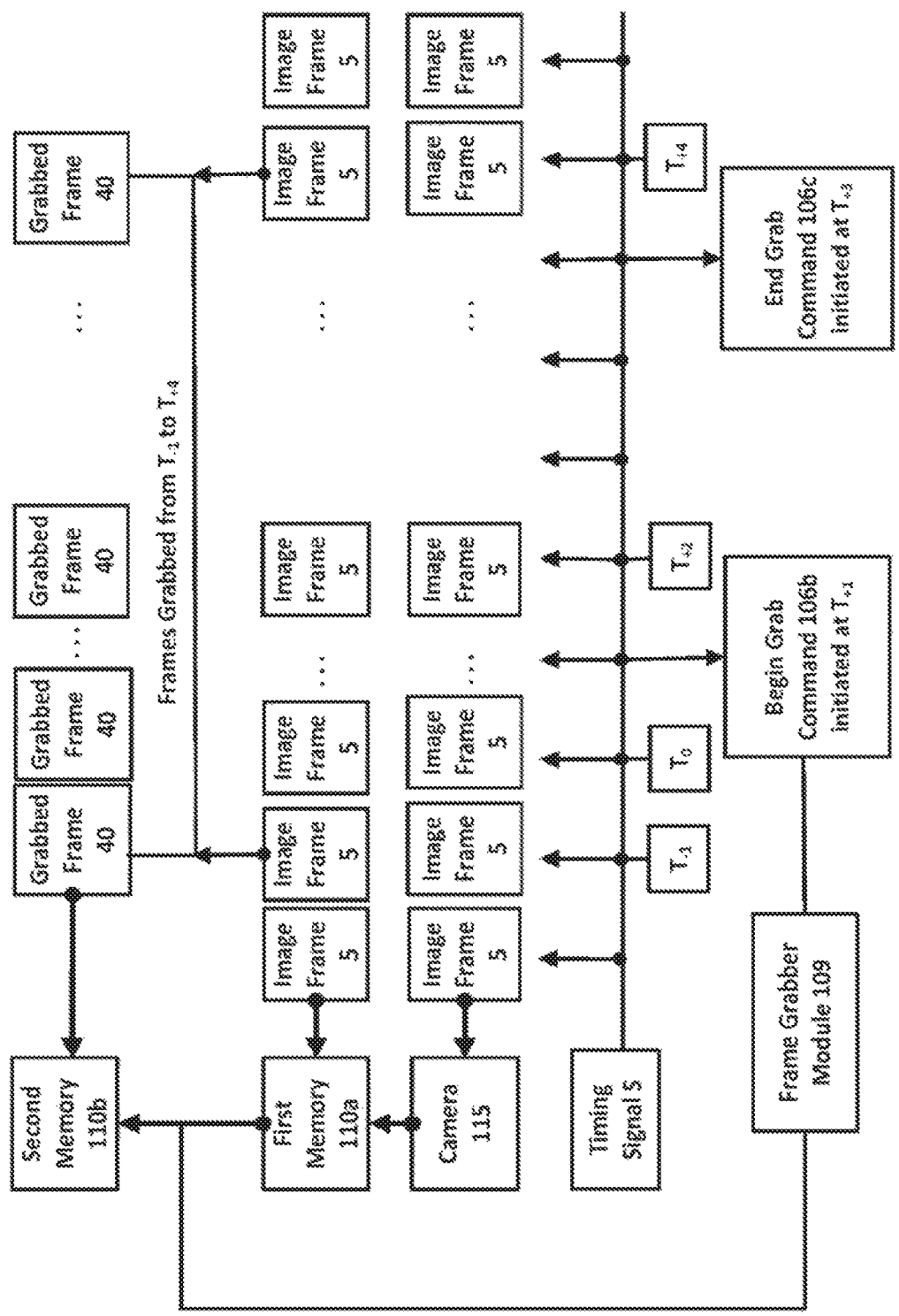
FIG. 8 is a schematic view of the timing of an image acquisition method in accordance with one or more embodiments of the present invention.

FIG. 7 is a schematic diagram of an image acquisition method in accordance with one or more embodiments of the present invention. FIG. 8 is a schematic view of the timing of an image acquisition method in accordance with one or more embodiments of the present invention.

In accordance with one or more embodiments of the present invention, one or more users utilizes system 100 to perform an image acquisition method 240 comprising one or more steps 242-248.

Image acquisition method 240 may be used to acquire one or more synchronous image frames 5 taken of event 10 within event space 15 and/or environment 16 using cameras 115. Image acquisition method 240 is not necessarily performed after an initial set-up method, but may be performed at any suitable time, including pre-event, when image frames of event space 15 and/or environment 16 may be desired.

In a step 242, as needed, a user places image-data system 100 in operational condition by powering one or more hardware and booting one or more software.

In a step 244, a user places system 100 in an imaging mode where system 100 continuously captures image frames 5 from one or more cameras 115. Since not all cameras 115 that are part of system 100 may be required to capture event 10 in event space 15 and/or environment 16, it should be understood that not all cameras 115 are necessarily used in the imaging mode.

The imaging mode begins with camera manager 106 issuing one or more imaging capture command 106*a* to trigger 107 to generate periodic timing signals S via timer 108 according to one or more predefined parameters, for example, to generate 30 signals every second. Imaging capture command 106*a* may then instruct timer 107 to propagate the timing signals in an instruction set from timer 108 via communications links 120 to one or more, but preferably all cameras 115 that are in use.

To reduce the chance of unintended delay and/or receiver delay, at least timer 108 may be located at a main node 120*b* that directly interconnects with communications links 120 such that all requisite cameras 115 receive the periodic timing signal S at substantially the same time.

In response to the instruction set, each camera 115 that receives the instruction set captures an image frame 5 and transmits image frame 5 to one or more servers 110. Preferably, each image frame 5 is saved in a raw image file format that preserves the imaging sensor's digital image data 6 in a "raw" pixel information or digital negative.

Image frame 5 may comprise in addition to image data 6 any necessary and/or suitable information to identify the image and/or camera or image sensor that has created the image. For example, the camera may be identified by a camera or imaging sensor identifier, spatial position data that has been previously determined or that has been determined by a Global Positioning System receiver, sequence stamp, and/or time stamp.

In server 110, frame grabber module 109 initiates storage in one or more memories 110*a* of a continuous stream of image frame 5. Although, memory 110*a* may be any suitable storage, memory 110*a* is preferably a cyclic buffer. To maintain the buffer so that a continuous stream of image frames 5 can be stored, frame grabber module 109 deletes and/or overwrites image frames 5 in a predetermined manner, e.g., deleting or overwriting the oldest image frames 5 before any subsequent image frames 5 are deleted or overwritten. Moreover, frame grabber module 109 continuously listens and/or awaits a begin-grab command 106*b* to grab image frames 40.

In a step 246, the user determines from the interface of camera manager 106 at imaging reference time $T_0$ when an opportune moment exists to capture video data of event 10. The user then initiates the grabbing of image 5 of event 10 by placing system 100 in a grab mode.

In accordance with one or more embodiments of the present invention, in the grab mode, camera manager 106 issues begin-grab command 106*b* at an imaging reference time $T_{+1}$. Once frame grabber module 109 receives begin-grab command 106*b*, frame grabber module 109 starting at a imaging reference time $T_{+2}$ stores image frames 5 arriving from camera 115 in second memory 110*b* for further processing. For clarity, an image frame 5 is being grabbed when that image is being stored or written and/or has been stored in or written to second memory 110*b*. An image frame 5 that is or has been grabbed may also be referenced as a grabbed frame 40.

Since there may be a delay (as for example during a live sports event) when the user recognizes that an opportune moment exists to capture image frames 5 of event 10 and initiates begin-grab command 106b, one or more image frames 5 stored in the cyclic buffer, i.e., first memory 110a, are also written to second memory 110b, in a backward grabbing operation. Preferably, the quantity of image frames 5 to be written from first memory 110a to second memory 110b is predetermined as a number of frames, e.g., 90 frames, or predetermined as a time period, i.e., 3 seconds, which at a frame capture rate of 30 frames per seconds corresponds to 90 seconds. Thus, the backward grabbing operation grabs image frames 5 from a time before imaging reference time To, i.e., imaging reference time $T_{-1}$ until imaging reference time $T_{+1}$. Since there may also be a delay in begin-grab command 106b reaching frame grabber module 109 from camera manager 106, the backward grabbing operation grabs image frames 5 from a time before imaging reference time To, i.e., imaging reference time $T_{-1}$ until imaging reference time $T_{+2}$.

In a step 248, at an imaging reference time $T_{-c_3}$ the user determines that image frames 5 of event 10 do not need to be grabbed any further. Grabbing of image frames 105 may continue until begin-grab command 106b is released, i.e., if begin-grab command 106b is initiated by continuously pressing a button, begin-grab command 106b times out after a predetermined time, or an end-grab command 106c is initiated by a user.

In the alternative to end-grab command 106c, the cyclic buffer size, i.e., when grabbing image frames 5 ceases, is preferably pre-determined as a function of the available memory, i.e., first memory 110a, relative to how long an event lasts, which may be measured in the number of frames to be rendered and/or measured in units of time where standard frames per second (FPS) are known. For example, a suitable cyclic buffer may be for example 900 frames, comprising 30 seconds @ 30 FPS and therein, the user may choose to grab anywhere between 1 to 900 frames. Controller 105 may include several "Grab Buttons" that execute begin-grab command 106b—for example, 1 sec, 10 sec, and 30 sec., each of which can be defined as a combination of backwards and forwards grabbing. For example, one button executing a begin-grab command 106b may grab 5 seconds of before execution of the command and 5 seconds after execution of the command. These variances are possible within the size of the full cyclic buffer. Once a grabbing operation has been made, the cyclic buffer transfers the image data to second memory 110b, and must save new image data in first memory 110a before another execution of another begin-grab command 106b is possible. Therein, the begin-grab command 106b functions as a command to transfer a one or more predetermined portions of first memory 110a to second memory 110b.

Thus, once an indication is received by frame grabber module 109 or when such an indication is inherent in the begin-grab command 106b at a imaging reference time $T_{+4}$ that grab mode has ceased, frame grabber module 109 reverts to storing image frames 5 in first memory 110a while frame grabber module 109 also continuously listens and/or awaits a new begin-grab command 106b. Throughout the grab mode, timer 108 continues to generate timing signals and issue instructions sets to one or more camera 115.

When, in accordance with one or more embodiments of the present invention, server 110 is configured so that one first memory 110a continuously writes, i.e., streams, image data in a raw image file format to the one or more second memories 110b, begin-grab command 106b may function as described above, but preferably transfers a one or more predetermined portions of first memory 110a to second memory 110b.

In accordance with one or more embodiments of the present invention, each camera 115 is operable with one server 110 reserved only for that camera; i.e., each camera 115 is in a one-to-one relationship with a server 110 dedicated only to that camera 115. Thus, in step 244, a frame grabber module 109 is operative on or with each server 110, which has a first memory 110a and second memory 110b dedicated only to one camera 115 and resulting in image frames 5 being stored to each server 110 individually in second memory 110b in a spread-through-system storage model. In contrast, in a collective storage model, one or more servers 110 may store image frames 5 from more than one camera 115 in one or more second memory 110b for further processing.

Regardless which storage model is used, all second memories 110b combine to form a real or virtual image database 50 comprising image data 6 of a plurality of image frame sets 7 of grabbed frames 40 taken over a period of time from imaging reference time $T_{-1}$ to $T_{+4}$ from at least two cameras 115 having different view fields 117 of at least the same part of event space 15 and/or environment 16.

Regardless which storage model is used, when data, such as processed frame 40a, is saved image database 50 the data is preferably using the same storage model. That is, if the image data 6 of a processed frame 40a was originally saved to a particular second memory 110b, then the processed frame 40a is also saved to that second memory 110b. However, in accordance with one or more embodiments of the present invention, processed frame 40a may be saved to a different second memory 110b or saved to any other suitable data storage.

In accordance with one or more embodiments of the present invention, camera location data 116a is stored in a camera location database 52. Therein, databases 50 and 52 are cross-referenced with each other by at least one or more reference data, e.g., a unique camera or imaging sensor identifier, related to cameras 115.

In accordance with one or more embodiments of the present invention, camera location data 116a of a camera 115 is stored in image-data databases 50 associated with one or more grabbed frames 40 from that camera.

In accordance with one or more embodiments of the present invention, CEM module 221 performs a color matching method 250 comprising steps 252-254 in order to provide color to mask model 241.

In a step 252, CEM module 221 projects each pixel in processed frame 40a on environment model 223, e.g., background 3D model, that comprises the environment. The projection is performed by extending an imaginary line from a pixel in processed image 40a, wherein each pixel is at the projection position 230a, passing through the center of a lens of a respective camera 115, and intersecting environment model 223, e.g., background 3D model, at a respective 3D mesh point 245 in the virtual 3D space 59. That is, the projection intersects the mesh of the mask model at a 3D mesh point 245 in the virtual 3D space 59.

Although in this disclosure, "pixel" is used in connection with configuration, rendering, and projection, it should be understood that "voxel" may also interchangeably be used. Therein, a "voxel" is a volumetric pixel. System 100 creates a faithful "voxel" representation of the foreground 17, i.e., foreground objects, in near-real-time, while the "background" or environment 16 is performed in a pre-event.

In a step 254, CEM module 221 converts the RGB color space of each processed frame 40a to laj3 color space. The configuration engine then finds means and standard deviations of the luma and color images. Then, the configuration engine subtracts the means of the source image from the source image pixel values as follows:

$$l^* = l - \langle l \rangle$$

$$\alpha^* = \alpha - \langle \alpha \rangle$$

$$\beta^* = \beta - \langle \beta \rangle$$

The configuration engine then scales the pixel values according to the factor between the standard deviations:

$$l' = \frac{\sigma_i^l}{\sigma_s^l} l^*$$

$$\alpha' = \frac{\sigma_i^\alpha}{\sigma_s^\alpha} \alpha^*$$

$$\beta' = \frac{\sigma_i^\beta}{\sigma_s^\beta} \beta^*$$

The configuration engine adds the destination means to the pixel value.

CEM module 221 converts the lap color space of each processed frame 40a to RGB color space.

CEM module 221 associates for each camera 115 the color value and the luma value, i.e., the brightness, as way to control the exposure of camera 115. CEM module 221 associates a pixel with a respective 3D mesh point 245 and saves the location of the 3D mesh point 245 and the color value in association with a camera identifier that captured the pixel to the model database 243. Since a particular location on the model may have been captured by more than one camera, each camera producing a pixel, each 3D mask point 245 associated with each camera may comprise multiple color values, which preferably arranged in a histogram, from multiple pixels.

Therein, a 3D mesh point 245 may be associated with multiple masks. For example, 3D mesh point 245 may be associated with whether the pixel is part of the ground or not, i.e., ground mask model; as well as whether the pixel is within the configuration and rendering area of the novel views, i.e., configuration and rendering mask model; and/or whether the pixel is within the color matching calculation area or not, i.e., color matching mask model. Moreover, these masks are continually updated and improved upon in the cycle of a system's configuration.

Reconstruction
Image Data Capture

FIG. 9 is a schematic diagram of an event capture method in accordance with one or more embodiments of the present invention.

In accordance with one or more embodiments of the present invention, a user utilizes an event capture module 301 of system 100 to execute an event capture method 300 comprising one or more steps 302-306, and of which one or more steps are preferably performed in the numerical sequence provided herein.

Event capture method 300 preferably executes on event capture module 301 to grab one or more image frame sets 7, extract one or more features 57 from the frame sets, and locate statistically reliable features in 3D data representation 60. Event capture module 301 embodied as a physical computing device in system 100 or associated with any other computing device, but preferably is software executing in controller 105 to allow for ease of adding one or more functions.

In a step 302, when desired during event 10, such when a pivotal moment occurs in a sports game, the user initiates event capture module 301 to grab one or more image frame sets 7 of synchronous image frames 5 from cameras 115 to database 50 to capture event 10.

Event capture module 301 may use any suitable method to obtain and save synchronous image frames 5 from cameras 115 to database 50. However, preferably, a method substantially similar to execute image acquisition method 240 is used.

In a step 304, each grabbed frames 40 is de-mosaiced and processed by event capture module 301 according to one or more de-mosaicing algorithms known in the art from the raw image file format to a formatted image file and is saved in image database 50. For example, each grabbed frame 40 is de-mosaiced and converted from a raw image file to a processed frame 40a of a .tiff image file or a .jpg image file.

In a step 306, event capture module 301 performs any suitable feature extraction method but preferably performs feature extraction method 226a to extract one or more features 57 from processed frames 40a showing event 10 and saves these to features database 58.

Stabilization

In accordance with one or more embodiments of the present invention, a user utilizes a stabilization module 309 of system 100 to execute a stabilization method 308 comprising one or more steps 310-316, and of which one or more steps are preferably performed in the numerical sequence provided herein.

Stabilization method 308 preferably executes on stabilization module 309 to determine projection position 230a comprising projection location data 230b for each camera 115 for image frame set 7 and to locate statistically reliable features in 3D data representation 60 or on an infinitely situated plane that is perpendicular to camera. Stabilization module 308 may be embodied as a physical computing device in system 100 or associated with any other computing device, but preferably is software executing in controller 105 to allow for ease of adding one or more functions.

In accordance with one or more embodiments of the present invention, stabilization method 308 occurs in a pseudo-3D space, wherein the features which are identified and compared against the reference calibration image do not necessarily correspond to a 3D data representation 60, e.g., volumetric point cloud, but are assumed to be located on an infinitely situated plane that is perpendicular to camera. The plane is preferably idealized as having no parallax that would occur with minor camera shaking or vibration.

In a step 310, stabilization module 309 begins to perform stabilization method 308 extracting features 57 from all image frames 5 of image frame set 7 acquired in step 306.

In a step 312, event capture module 301 compares features 57 extracted in step 310 to features 57 that were extracted during CEM method 220 to compensate for unintended camera movements. Projection location data 230b are created by module 301 to create one or more camera matrices 311 to describe for each camera 115 mapping image data 6 from 2D position of a processed frame 40a to a 3D coordinate position in 3D space 59.

Camera matrices 311 may be used in other steps to compensate for unintended camera movement. That is, each camera matrix 311 defines a position of camera 115, which is re-defined when camera 115 is in a position has moved due to a variety of factors, e.g., wind or pedestrian traffic affecting the superstructure to which camera 115 may be secured.

In a step 314, stabilization module 309 iterates a feature extraction method preferably substantially similar to feature extraction method 226a to extract and save further features 57 in proximity to features 57 found in step 306 or 308. In particular, after prominent features 57 have been extracted, further features 57 in proximity to the first found features but having a lower degree of confidence in the one or more extraction algorithm are extracted and saved to features database 58. Event capture module 301 continues executing a feature extraction method to extract and save features 57 in proximity to features 57 found in the immediate prior iteration or any iteration, wherein each iteration has a lower degree of confidence in the one or more extraction algorithm being used.

In a step 316, stabilization module 309 uses principles of proximity, sparseness, and similarity as are known in the art to remove outliers in features database 58 so that when features 57 are projected in 3D space 59 to create a 3D data representation 60 where erroneous features 57 have been reduced.

In accordance with one or more embodiments of the present invention, an interquartile range method preferably is used. Therein, if a 3D data point has an x, y, or z coordinate that is outside of the upper and lower quartile range, the 3D data point is removed. That is for data point having any coordinate a in a list where Q1 is first quartile and Q3 is the third quartile, the data point is eliminated if it meets one of the following conditions:

$$\alpha < Q1 - (Q3-Q1) \times 1.5 \text{ or}$$

$$\alpha > Q3 - (Q3-Q1) \times 1.5.$$

Therein, preferably a Levenberg-Marquardt Optimization as is known in the art is used to distribute the errors. Preferably camera matrices 311 and 233 are substantially identical for one or more respective cameras 115.

Segmentation of Foreground from Environment

Figure 10F:
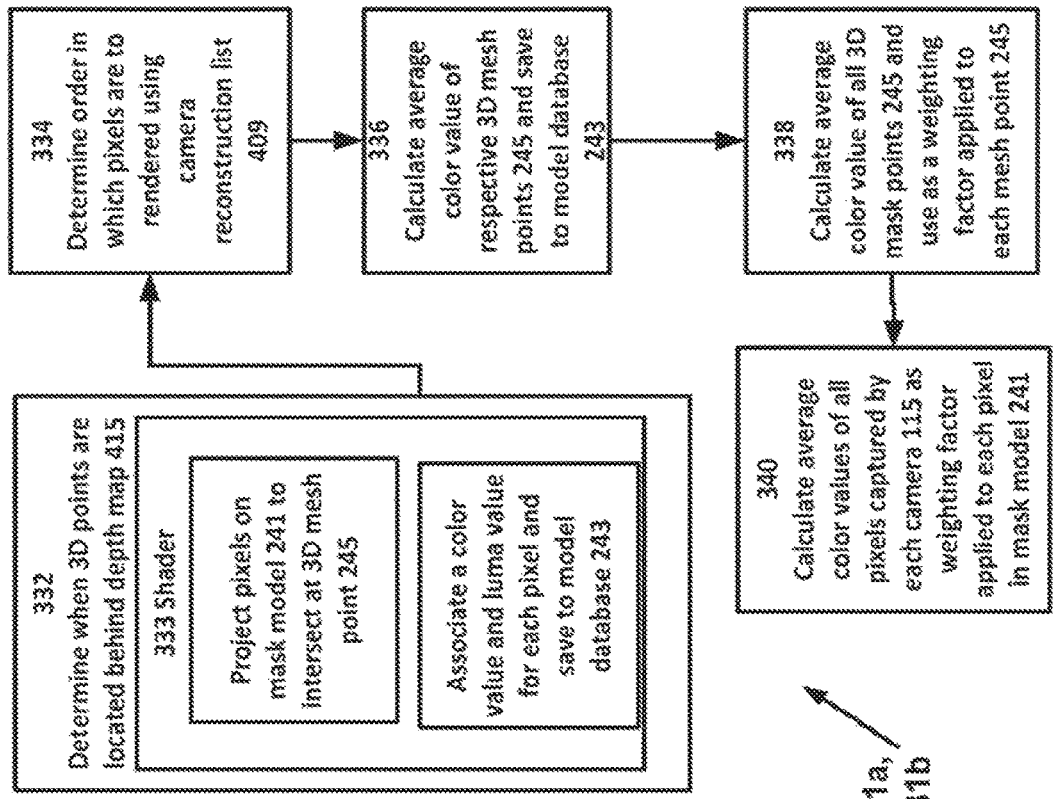
FIG. 10F is a schematic diagram of an environment modeling method in accordance with one or more embodiments of the present invention.
Figure 10A:
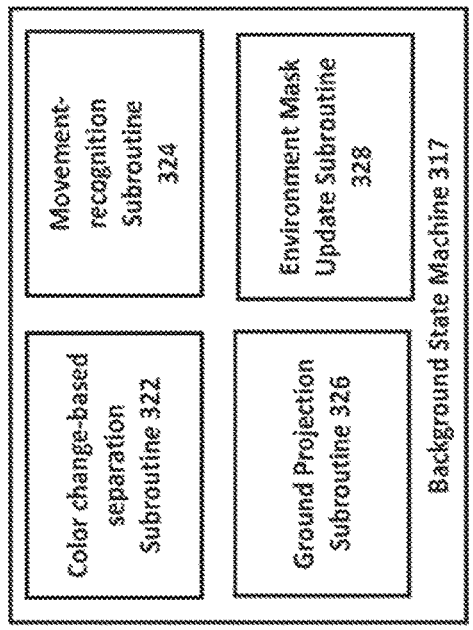
FIG. 10A is a schematic diagram of an environment modeling method in accordance with one or more embodiments of the present invention.
Figure 10E:
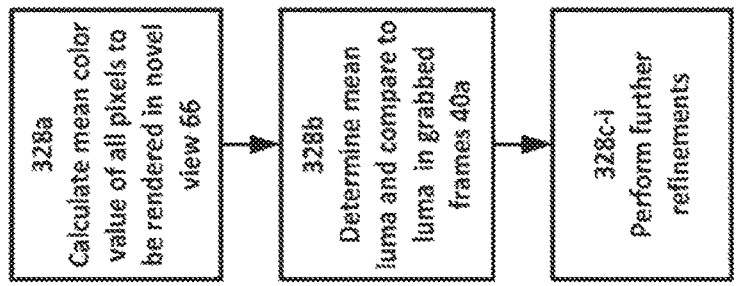
FIG. 10E is a schematic diagram of environment update subroutine in accordance with one or more embodiments of the present invention.
Figure 10D:
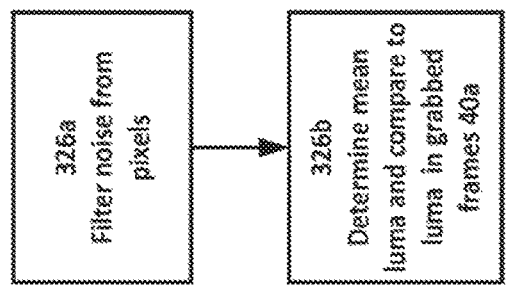
FIG. 10D is a schematic diagram of ground projection segmentation and reconstruction method in accordance with one or more embodiments of the present invention.
Figure 10C:
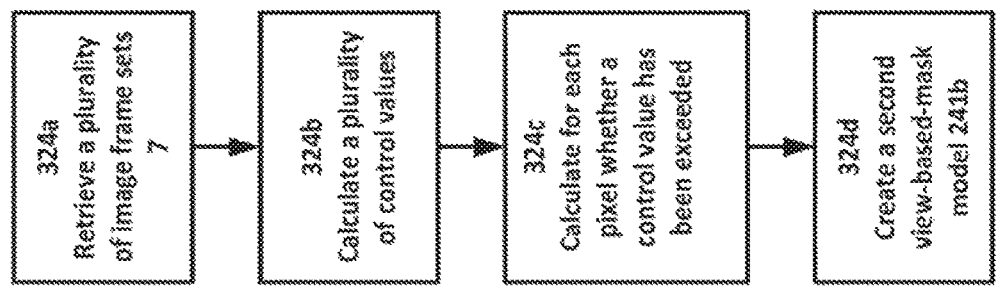
FIG. 10C is a schematic diagram of a color change-based segmentation and reconstruction method in accordance with one or more embodiments of the present invention.
Figure 10B:
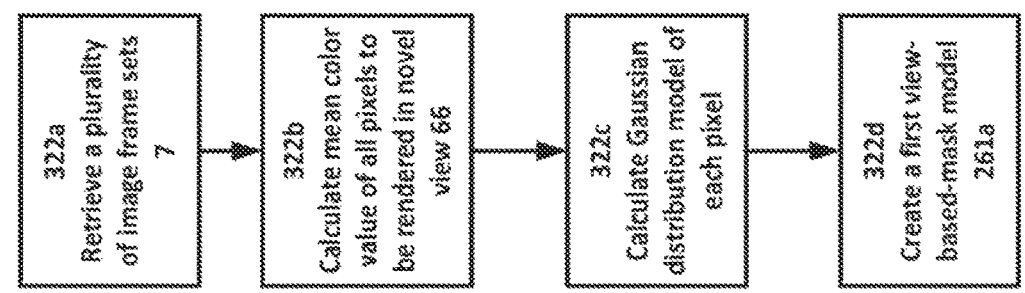
FIG. 10B is a schematic diagram of a color change-based segmentation and reconstruction method subroutine in accordance with one or more embodiments of the present invention.

FIG. 10a is a schematic diagram of an environment modeling method in accordance with one or more embodiments of the present invention. FIG. 10b is a schematic diagram of a color change-based segmentation and reconstruction method subroutine in accordance with one or more embodiments of the present invention. FIG. 10c is a schematic diagram of a color change-based segmentation and reconstruction method in accordance with one or more embodiments of the present invention. FIG. 10d is a schematic diagram of ground projection segmentation and reconstruction method in accordance with one or more embodiments of the present invention. FIG. 10e is a schematic diagram of environment update subroutine in accordance with one or more embodiments of the present invention.

In accordance with one or more embodiments of the present invention, a user utilizes a segmentation and reconstruction (FES) module 319 of system 100 to execute a foreground/environment segmentation (FES) method 318 comprising one or more steps 322-328, and of which one or more steps are preferably performed in the numerical sequence provided herein.

Figure 11A:
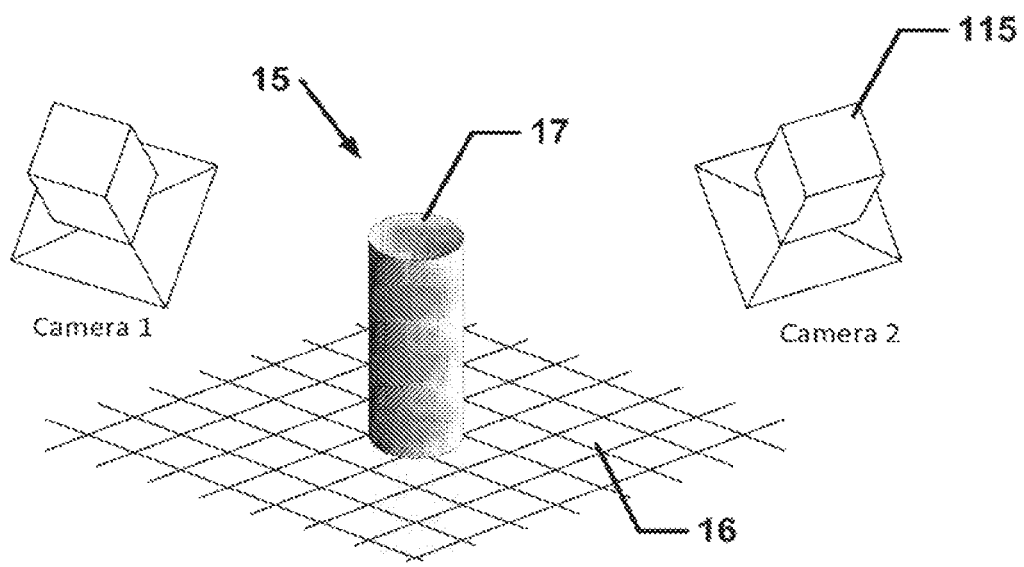
FIG. 11A is a schematic view of a captured event from a view that is not coincident with a camera in accordance with one or more embodiments of the present invention.
Figure 11B:
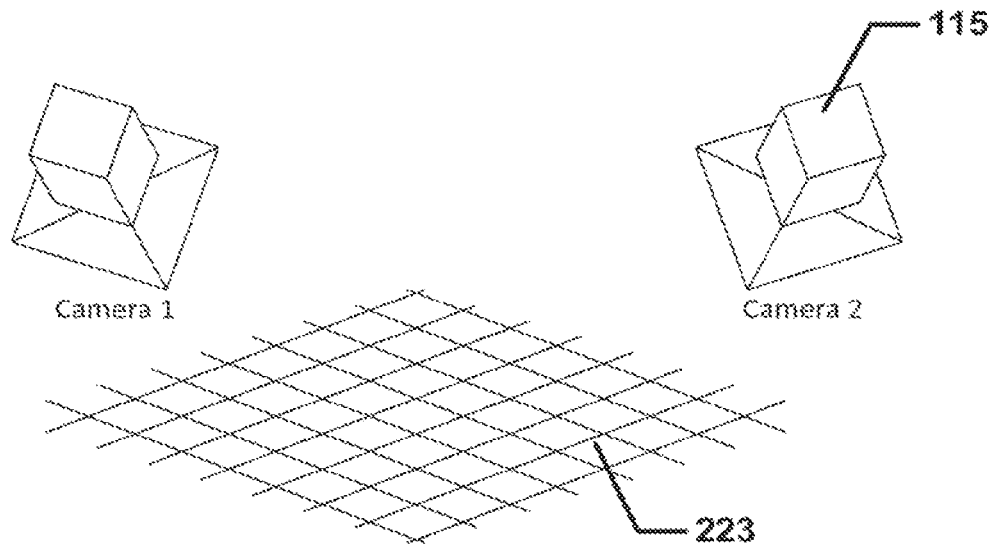
FIG. 11B is a schematic view of an environment model of the captured event of FIG. 11A.
Figure 11C:
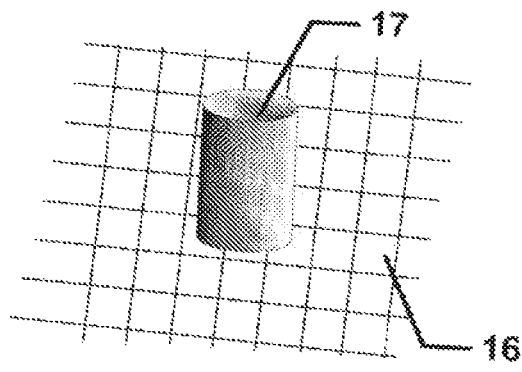
FIG. 11C is a schematic view of the captured event of FIG. 11A as seen from a first camera, i.e., camera 1.
Figure 11D:
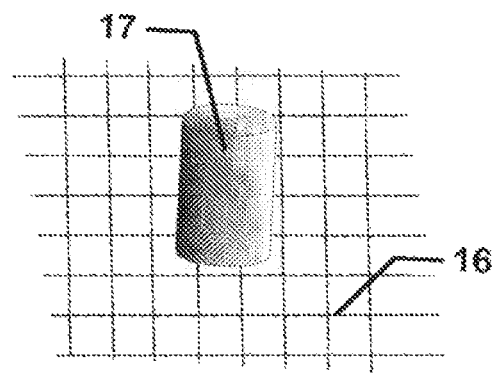
FIG. 11D is a schematic view of the captured event of FIG. 11A as seen from a second camera, i.e., camera 2.
Figure 11E:
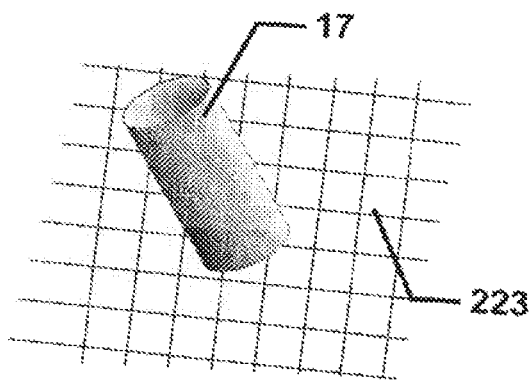
FIG. 11E is a schematic view of the foreground of FIG. 11D imaged by the second camera when projected onto the environment model of FIG. 11B and viewed by the first camera.
Figure 11F:
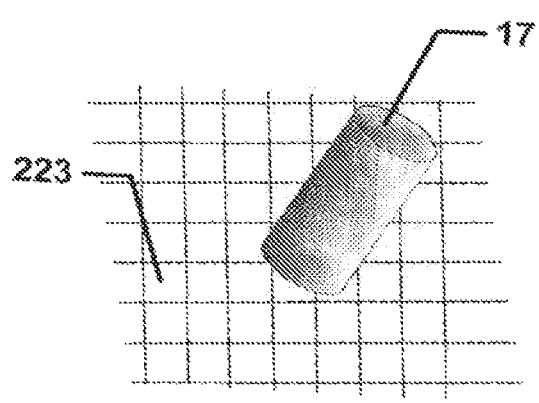
FIG. 11F is a schematic view of the foreground of FIG. 11C imaged by the first camera when projected onto the environment model of FIG. 11B and viewed by the second camera.
Figure 11G:
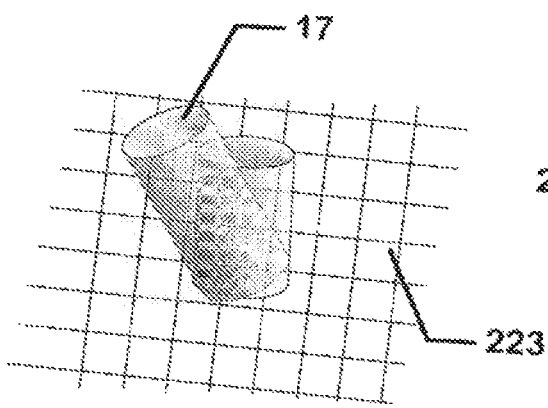
FIG. 11G is a schematic view of a foreground imaged by the second camera when projected onto the environment model of FIG. 11B and viewed by the first camera.
Figure 11H:
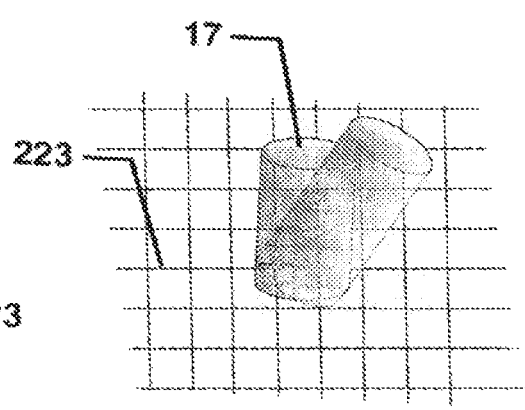
FIG. 11H is a schematic view of a foreground imaged by the first camera when projected onto the environment model of FIG. 11B and viewed by the second camera.
Figure 11I:
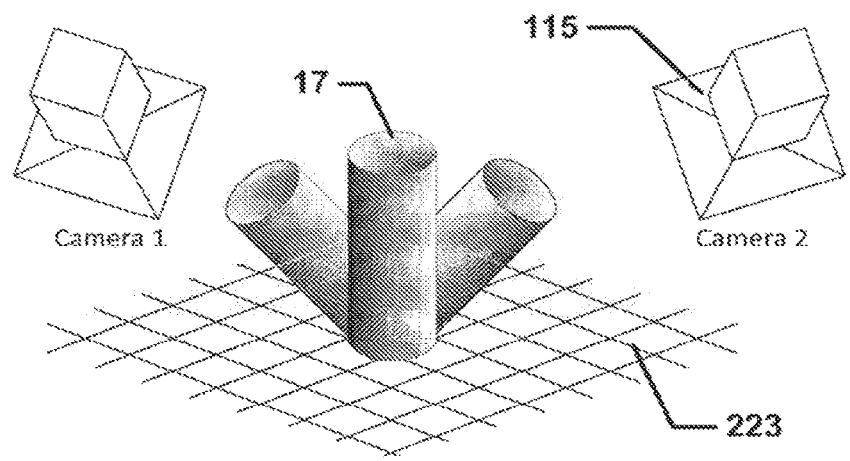
FIG. 11I is a schematic view from a novel view of the captured event of FIG. 11A wherein the foreground as imaged by both the first camera and the second camera and overlayed onto an environment model.
Figure 11J:
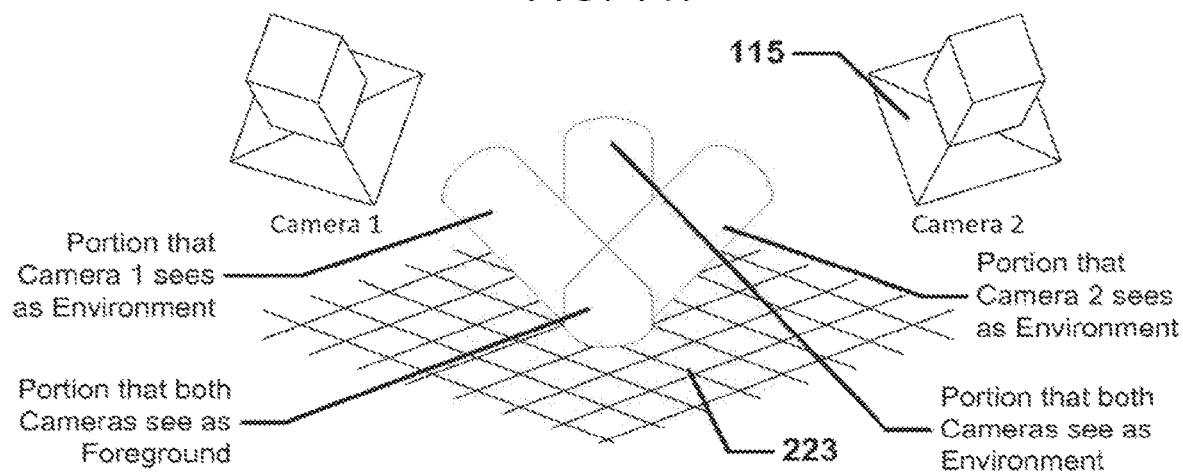
FIG. 11J is a schematic view from a novel view showing the foreground as seem by both cameras.
Figure 11K:
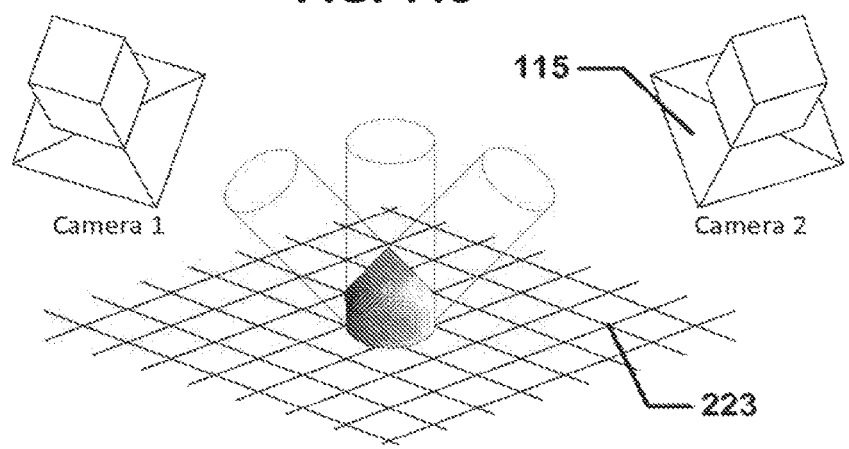
FIG. 11K is a schematic view of FIG. 11J showing where environment data exists.
Figure 11L:
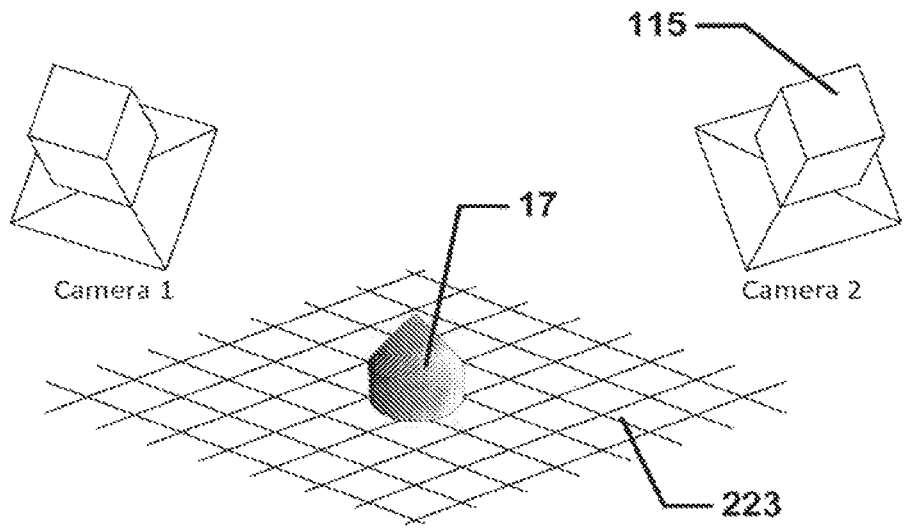
FIG. 11L is a schematic view of FIG. 11K showing the environment model with the foreground that cannot be viewed by both cameras removed.
Figure 11M:
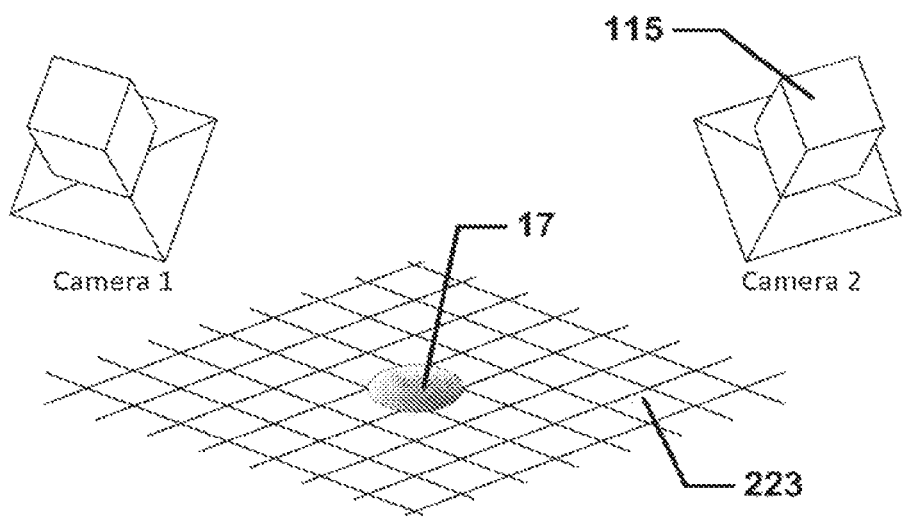
FIG. 11M is a schematic view of FIG. 11K showing the environment model with the foreground that cannot be viewed by both cameras removed and foreground that cannot be viewed by additional cameras removed.

FIGS. 11A-11K illustrate the segmentation of the foreground from the environment in order to obtain an environment model 223. Therein, FIG. 11A is a schematic view of a captured event from a view that is not coincident with a camera in accordance with one or more embodiments of the present invention. FIG. 11B is a schematic view of an environment model of the captured event of FIG. 11A. FIG. 11C is a schematic view of the captured event of FIG. 11A as seen from a first camera, i.e., camera 1. FIG. 11D is a schematic view of the captured event of FIG. 11A as seen from a second camera, i.e., camera 2. FIG. 11E is a schematic view of the foreground of FIG. 11D imaged by the second camera when projected onto the environment model of FIG. 11B and viewed by the first camera. FIG. 11F is a schematic view of the foreground of FIG. 11C imaged by the first camera when projected onto the environment model of FIG. 11B and viewed by the second camera. FIG. 11G is a schematic view of a foreground imaged by the second camera when projected onto the environment model of FIG. 11B and viewed by the first camera. FIG. 11H is a schematic view of a foreground imaged by the first camera when projected onto the environment model of FIG. 11B and viewed by the second camera. FIG. 11I is a schematic view from a novel view of the captured event of FIG. 11A wherein the foreground as imaged by both the first camera and the second camera and overlayed onto an environment model. FIG. 11J is a schematic view from a novel view showing the foreground as seem by both cameras. FIG. 11K is a schematic view of FIG. 11J showing where environment data exists. FIG. 11L is a schematic view of FIG. 11K showing the environment model with the foreground that cannot be viewed by both cameras removed. FIG. 11M is a schematic view of FIG. 11k showing the environment model with the foreground that cannot be viewed by both cameras removed and foreground that cannot be viewed by additional cameras removed.

Specifically, since each camera 115 has a particular view field 117, each camera will see a foreground element 17 from a different angle and, thus, obstruct a different part of environment 16. Once each camera's view are projected onto a novel view and the non-overlapping portions are subtracted from each other, more of the environment can be seen in the novel view. Almost all of the environment may be seen if all cameras are well placed and are applied (FIG. 11M) as opposed to when just a few cameras are used (FIG. 11L).

Specifically, FES module 319 executes a foreground/environment segmentation method 318 to separate one or more pixels associated with the live element into foreground elements, i.e., those that are part of the event 10 as foreground 17 or whether the pixel is part of environment 16, i.e., an environment element executing as a background state machine 317.

In accordance with one or more embodiments of the present invention, foreground/environment segmentation method 318 preferably comprises a color change-based separation subroutine 322, a movement-recognition subroutine 324, ground projection subroutine 326, and an environment update subroutine 328.

In accordance with one or more embodiments of the present invention, in color change-based separation subroutine 322, FES module 319 initiates background state machine 317 to analyze whether a pixel is a foreground element or an environment element based on changes in the color of the pixel over a period of time. A pixel in foreground 17 will be rendered; a pixel in environment 16 will not be rendered separately from environment model 223.

Therein, background state machine 317 analyzes if the same pixel has changed color according to a predetermined level from image frame sets 7 of synchronous image frames 5 that are adjacent in time by one or more predetermined amount of time. Background state machine 317 is used for two purposes. The first is as a "hint" in the motion detection module that produces masks, and as a "layer" in the shader process, i.e., shading methods 331a and/or 331b, which comes into play should an area/pixel be completely occluded from all cameras on the environment model 223, i.e., background model. For example, a huddle of players creates areas on the ground unseen by any direct camera.

If the RGB color of the pixel stays the same throughout the time by the predetermined level, background state machine 317, which if the background state machine is set to default to environment 16 and not foreground 17, will determine that the pixel is environment element. If the RGB color has varied throughout the time by the predetermined level, background state machine 317 will determine that pixel is a foreground. Therein, background state machine 317 is active concurrent with grabbing of frames 40. The resultant "clean background" are saved per each grab and are used as described herein.

If the RGB color of the pixel stays the same throughout the time, background state machine 317, which if the background state machine is set to default to foreground and not environment, will determine that the pixel is an environment element. If the RGB color has varied throughout the time by the predetermined level, background state machine 317, will determine that pixel is foreground 17.

In a step 322a, FES module 319 retrieves a plurality of image frame sets 7 of synchronous grabbed frames 40 that are adjacent in time from image database 50.

In a step 322b, FES module 319 calculates the mean color value using preferably the RGB color space of all pixels to be rendered in novel view 66.

In a step 322c, FES module 319 calculates a Gaussian distribution model of each pixel. Therein, FES module 319 preferably uses a camera reconstruction list 409 (described below) to determine the order in which grabbed frames 40a are to be analyzed, i.e., a processed frame 40a from a (first) camera 115 listed before another (second) camera 115 is analyzed before the grabbed frame of the second camera, and each frame set 7 is analyzed preferably in chronological order. In the alternative to camera reconstruction list 409, a sequential camera list based on physical positional adjacency may be used.

After analyzing each processed frame 40a, FES module 319 updates the Gaussian statistics. A pixel is determined by FES module 319 to be a foreground element if the pixel is within the Gaussian standard deviation. If the pixel is not within the Gaussian standard deviation after all grabbed frames 40 have been analyzed, the pixel is determined by FES module 319 to be an environment element.

In a step 322d, FES module 319 then creates a first view-based mask model 223a of the environment comprising all pixels that are environment elements as determined in step 322c. Therein, for each pixel or feature, determine whether the pixel or feature is foreground 17 or environment 16, based on a scanline mechanism (i.e. what a perpendicular "ray" from the camera's raster's pixel would hit). If the feature is a foreground object, it is "shaded," i.e., colored, via the foreground procedures. If it is a background element, it is "shaded," i.e., colored, via the background shader process.

In accordance with one or more embodiments of the present invention, in movement-recognition subroutine 324, FES module 319 initiates background state machine 317 to analyze whether a pixel is moving over time within the event space. A pixel that moves is indicative that it is part of event 10 and not part of environment 16.

In a step 324a, FES module 319 retrieves a plurality of image frame sets 7 of synchronous grabbed frames 40 that are adjacent in time from image database 50 or uses the plurality of image frame sets 7 of synchronous grabbed frames 40 retrieved in step 322a.

In a step 324b, FES module 319 calculates a plurality of values that are then matched to control values. In particular,
 a. if the luma of a pixel exceeds a threshold value, the pixel is determined to be a foreground element
  Difference Threshold (Difff hr)—min Luma difference per channel for movement
 b. if the pixel moves by at least a pre-determined percentage, the pixel is determined to be a foreground element.
  Movement Threshold—(MoveThr) min movement percentage value (frames>Difff hr/frames<Difff hr)

In a step 324c, FES module 319 calculates whether each pixel has exceeded one or more control values calculated in step 324b. Therein, FES module 319 preferably uses camera reconstruction list 409 to determine the order in which grabbed frames 40a are to be analyzed, i.e., a processed frame 40a from a (first) camera 115 listed before another (second) camera 115 is analyzed before the grabbed frame of the second camera, and each frame set 7 is analyzed preferably in chronological order.

After analyzing each processed frame 40a, FES module 319 determines a pixel to be a foreground element if the pixel exceeds one or more of the control values calculated in step 324b. If the pixel does not exceed the control values after all grabbed frames 40 have been analyzed, the pixel is determined by FES module 319 to be an environment element.

In a step 324d, FES module 319 then creates a second view-based environment model 223b of the environment comprising all pixels that are environment elements determined in step 324c.

In accordance with one or more embodiments of the present invention, in ground projection subroutine 326, FES module 319 initiates background state machine 317 to analyze whether a pixel is part of the ground and, thus, is an environment element. A pixel that is part of the ground is part of environment 16.

In a step 326a, FES module 319 sets a filter to filter out "noise" from the pixels using a setting of up to 1% filtering. For example, a Wiener noise filter may be used.

In a step 326b, FES module 319 based on the grabbed frames 40a that are being or were analyzed in steps 322b, 322c, 324b, and 324c determine if the mean luma value in an RGB color space of the grabbed frames 40a from any one camera 115 is greater than a first pre-determined value then configuration engine 401 will update the luma value of environment model 223 by a factor suitable to raise the luma value by a second pre-determined value. For example, the first pre-determined value may be equal to 5-40 lumas of the luma value of environment model 223 and the second pre-determined value may be equal to an average of all difference in luma values between grabbed frames 40a and the luma value of environment model 223.

In accordance with one or more embodiments of the present invention, in environment update subroutine 328, FES module 319 initiates background state machine 317 to preferably contemporaneously update environment model 223.

In a step 328a, FES module 319 calculates the mean color value using preferably the RGB color space of all pixels to be rendered in novel view 66.

In a step 328b, FES module 319 based on the grabbed frames 40a that are being or were analyzed in steps 322b, 322c, 324b, and 324c determine if the mean luma value in an RGB color space of the grabbed frames 40a from any one camera 115 is greater than a first pre-determined value then configuration engine 401 will update the luma value of environment model 223 by a factor suitable to raise the luma value by a second pre-determined value. For example, the first pre-determined value may be equal to 50% greater than the luma value of environment model 223 and the second pre-determined value may be equal to an average of all difference in luma values between grabbed frames 40a and the luma value of environment model 223.

In a step 328c, other thresholds, including a binary thresholds are determined to obtain Quasi-Minimal Residual Value and/or the background is updated by removing features 57 which are part of foreground 17 to provide a clean foreground.

In a step 328d, FES module 319 determines an initial mask that is the difference between an existing background and a new image frame 5 to determine if additional features 57 are present. To amplify, the difference is squared.

In a step 328e, noisy features 57, such as those having more pixel space—for example, 3×3 pixels are removed by FES module 319 in order to make less noisy features stand out.

In a step 328f, a shadow of the background is removed by FES module 319 and the difference between new image frame 5 and an unmasked area versus the unmasked area in the Background in LAB (laf3) space, is determined while searching for pixels, i.e., features, where the luma difference is greater a threshold but the AB (UV in YUV or Chroma) is low. The luma is then updated in these areas.

Therein, FES module 319 converts the RGB color space of each processed frame 40a to laf3 color space. The configuration engine then finds means and standard deviations of the luma and color images. Then, the configuration engine subtracts the means of the source image from the source image pixel values as follows:

$$l^* = l - \langle l \rangle$$

$$\alpha^* = \alpha - \langle \alpha \rangle$$

$$\beta^* = \beta - \langle \beta \rangle$$

The configuration engine then scales the pixel values according to the factor between the standard deviations:

$$l' = \frac{\sigma_i^l}{\sigma_s^l} l^*$$

$$\alpha' = \frac{\sigma_i^\alpha}{\sigma_s^\alpha} \alpha^*$$

$$\beta' = \frac{\sigma_i^\beta}{\sigma_s^\beta} \beta^*$$

The configuration engine adds the destination means to the pixel value.

FES module 319 converts the $l\alpha\beta$ color space of each processed frame 40a to RGB color space.

In a step 328, FES module 319 updates the environment model 223 with a blend from the new image outside the mask.

In a step 328h, configuration engine 401 saves the updated environment model 223 and a foreground mask 423 in image database 50.

In a step 328i, the foreground is then refined based on the information in the prior steps.

Shading

FIG. 10F is a schematic diagram of an environment modeling method in accordance with one or more embodiments of the present invention.

In accordance with one or more embodiments of the present invention, a user utilizes a environmental shading module 330a of system 100 to execute an environmental shading method 331a and/or foreground shading module 330b to execute a foreground shading method 331b comprising one or more steps 332-340, and of which one or more steps are preferably performed in the numerical sequence provided herein.

The shading methods 331a and/or 331b preferably execute on shading modules 330a and/or 330b, respectively, and may be embodied as a physical computing device in system 100 or associated with any other computing device, but preferably is a software executing in controller 105 to allow for ease of adding one or more functions.

In a step 332, module 330b executes a shader 333 to determine using a depth map 415 (described below) when 3D points of 3D data representation reconstruction are located behind the depth map 415, e.g., when 3D points are not occluded by another point from novel view 66. That is, a pixel that is behind the depth map is not rendered.

Shader 333 may be embodied as a physical computing device in system 100 or associated with any other computing device, but preferably is a software executing in controller 105 to allow for ease of adding one or more functions.

In a step 334, configuration engine 401 uses the camera reconstruction list 409 to determine the order in which pixel are to be rendered in environment model 223 and foreground model 423.

Shader 333 will, for each rendered pixel in novel view 66, determine color information based on the color values of the grabbed frames 40a that include the pixel. If the pixel is not occluded, the color value is determined using a factor that may be determined using any suitable means, but preferably is weighted in proportion to an angle between the vector from virtual camera 66a towards the pixel and the vectors from each camera 115 that imaged the pixel towards the pixel itself.

Therein, the color value factor of a pixel may be determined by the following equation:

Color Value Factor=(0.5*pow(angleFactor,projector-WeightFactor))+(0.5*pow(angleFactor,projectorWeightFactor1))

In the alternative or in addition, a shader 333 is not used. Rather, a listing of cameras 115 based on physical adjacency is used to determine if a feature 57 imaged by one camera is occluded when viewed by another camera 115. If so, a value of (0) is placed in a look-up table relative to the camera 115 having an occlusion.

In a step 336, module 330a calculates an average color value of each 3D mesh point 245 and saves it to mask model database 243. The average color value, thus, is the average of the color seen by all cameras on the same 3D location of the mask model, or in other words the average color of the same mask model spot seen by all cameras. In addition or in the alternative, rather than using a mesh, a point cloud or a 3D data representation may be used.

In a step 338, module 330a calculates an average color value of all 3D mesh points 245 in order to have an average color value for mask model 241 as a weighting factor to be applied to the color value of each 3D mesh point 245.

In a step 340, module 330a calculates an average color value for all pixels captured by each camera 115 in order to have an average color value for each camera as a weighting factor to be applied to the color value of each pixel from cameras having camera locations that are physically adjacent in order to bring the color of adjacent cameras closer to each other and creating color consistency that will assist creating a cohesive novel views when moving a virtual camera between novel views.

In the alternative or in addition, each module produces a new color "look up table," which is used to regenerate the "projection rasters/images" from the raw data with better color coherency between sequential cameras. Thus, configuration engine 401 does not need to know any information on color matching, rather color simply gets as input raster images for projecting a more coherently colored set of images. Therein, the projected input causes a final broadcast color output, in which the vibrancy of the color is more important than getting clean and consistent gradients for reconstruction. In contrast, reconstruction by itself usually results in darker images used for reconstruction purposes as compared to the final broadcast images in accordance with one or more embodiments of the present invention.

Configuration

Figure 12A:
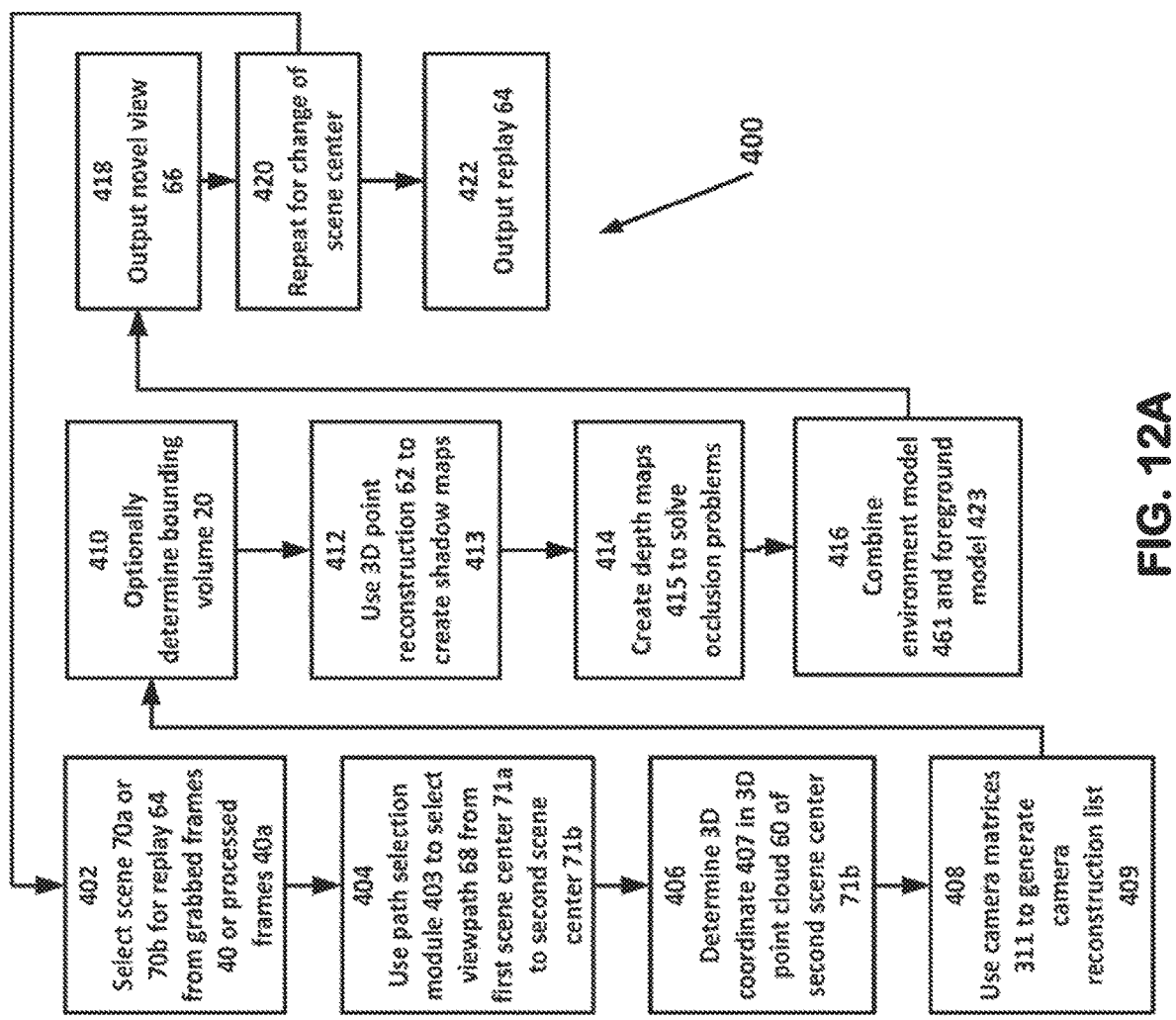
FIG. 12A is a schematic diagram of a configuration method in accordance with one or more embodiments of the present invention.

FIG. 2D is a plan view of virtual cameras, a plurality of novel views, a portion of a view path, view fields of real cameras in the event space of FIG. 2A and FIG. 2C. FIG. 12A is a schematic diagram of a configuration method in accordance with one or more embodiments of the present invention.

In accordance with one or more embodiments of the present invention, a user utilizes a configuration engine 401 of system 100 to execute a configuration method 400 comprising one or more steps 402-432, and of which one or more steps are preferably performed in the numerical sequence provided herein.

Configuration method 400 preferably executes on configuration engine 401 to perform a 3D data representation reconstruction 62 of event 10 occurring at least at an imaging reference time TM in part or all of event space 15 to permit a replay 64 of event 10 occurring at imaging reference time TM from one or more user-selectable novel views 66.

Configuration engine 401 may be embodied as a physical computing device in system 100 or associated with any other computing device, but preferably is software executing in controller 105 to allow for ease of adding one or more functions.

A replay 64 is a rendered sequence of one or more novel views 66 and/or one or more views coincident with view fields 117 along a view path 68. View path 68 is preferably a 3D user-selectable path either in a static setting or in a dynamic setting, explained further below.

A novel view 66 is a rendered view of 3D data representation reconstruction 62 that does not necessarily coincide with view field 117 of any camera 115 that contributed image data 6 to 3D data representation reconstruction 62. Coincide specifically excludes view fields 117 that are changed by cropping image frame 5 and/or shifting a center of image frame 5 post-capture of image frame 5. That is, if a view field is altered in these ways, view field 117 is still the original view field.

For example, a plurality of cameras 115 capture image frame set 7 which each frame set comprises image data 6 that show at least half of the face of a person obliquely, but none of the plurality of cameras 115 provides a front view of the face because none of the view fields 117 was oriented such that the face could be captured. Thus, a front view of the person's face would be a novel view 66 since none of the view fields coincides with the novel view.

For clarity, each novel view 66 may be thought of to comprise a virtual camera 66a and the respective novel view 66 to originate from the center of that virtual camera 66a.

Each view path 68 comprises one or more novel views 66 and may comprise one or more views coincident with view fields 117. View path 68 can be chosen by a user; specifically scene center 68a is chosen by user using one or more human interface device on controller 105 using a path selection module 403. Path selection module 403 may be embodied as a physical computing device in system 100 or associated with any other computing device, but preferably is software executing in controller 105 to allow for ease of adding one or more functions.

View path 68 may include pre-programmed cinematic paths such as an arc path, height path, in-out path. Therein, an arc path reconstructs a virtual rail where the camera moves either left or right. This is the first degree of motion and always ensures that the viewing point is optimized for a 3D data representation reconstruction. An elevation rail, i.e., height path, is a virtual rail that is the second degree of freedom that enables vertical motion for either direction. Elevating the virtual rail up while moving the camera along the arc rail will create a diagonal motion from bottom to top. A dolly trail, i.e., in-out path, is a third rail for the virtual camera so that the virtual camera moves from the arc rail to the aim target, and creates the third degree of freedom that allows moving back and forth in to the target.

In a step 402, the user selects a scene 70a for replay 64 from a plurality of grabbed frames 40 or from a plurality of processed frames 40a. In that respect, the user can switch among a feed from several of the monitors of each camera 115 to determine the most advantageous scene 70a from which to begin replay 64.

Therein, the user can play grabbed frames 40 for each camera 115 as a video, stopping it as desired to find the most advantageous moment for beginning replay 64. For clarity, this advantageous moment for beginning replay 64 is referenced as imaging reference time TM, wherein TM falls within imaging reference time $T_{-1}$ to $T_{+4}$. A static setting is one where replay 64 occurs in a frozen moment in time, i.e., limited to imaging reference time TM.

A dynamic setting is one where replay 64 occurs without time being frozen, i.e., replay 64 occurs from imaging reference time $T_{M1}$ to $T_{M2}$, wherein imaging time range $T_{M1}$ to $T_{M2}$ falls within imaging reference time $T_{-1}$ to $T_{+4}$. Thus, the most advantageous moment for beginning replay 64 is referenced as imaging reference time $T_{M1}$ and the imaging moment for stopping replay 64 is referenced as imaging reference time $T_{M2}$.

In other words, a dynamic setting is one where a user decides on a range of image frame sets 7 for each imaging reference time that are processed as a series stepping through imaging reference time. Significantly, each image frame set 7 is processed as an independent 3D data representation for each set of image frames. However, just like in static setting, the results of each image frame set 7 may be used either via the camera path interface to produce a "dynamic" replay where each novel view results from an independent 3D data representation of the requisite set of image frame set, or be sent to a server/cloud for interactive viewing over a mobile device, etc., i.e. client.

Moreover, the user can select from among the grabbed frames 40a of image frame sets 7 having imaging reference time $T_M$ or $T_{M1}$ to select the camera having the most advantageous scene 70a from which to begin replay 64.

Once the user has selected the most advantageous moment and scene, the user at that time has selected a scene center 71a that is coincident with view field 117 of camera 115 that originates the scene and the image frame set 7 having imaging reference time $T_M$ or $T_{M1}$ from which to produce 3D data representation reconstruction.

In a step 404, the user utilizes path selection module 403 to select view path 68 that moves from first scene center 71a to a new scene center 71b, wherein the new scene 71b associated with the new scene center 71b would be a novel view 66. View path 68 may comprise a plurality of scene shifts from one scene center to a new scene center.

In a step 406, configuration engine 401 determines a 3D coordinate 407 in 3D data representation 60 of second scene center 71b; the 3D coordinate 407 of second scene center 71b is also the 3D location of virtual camera 66a. That is, scene 70b is a plane having a center, e.g., scene center 71b, that is taken from a virtual camera 66a and wherein the center of the virtual camera is the scene center 71b.

In a step 408, configuration engine 401 uses camera matrices 311 to generate a list of cameras 115, i.e., camera reconstruction list 409, that lists an identifier and any other suitable information for cameras 115 in order based on physical proximity of that projection position 230a associated with scene center 71b. That is camera 115 that is most proximal to scene center 71b has its identifier and information list first. The second listed camera and other camera are listed by the configuration engine 401 in order of proximity, i.e., adjacency of the first listed camera so that the image data 6 of cameras 115 can be processed in a priority order.

In a step 410, in order to speed up processing, a user, who may be a television producer, limits an extent to which event space 15 will be rendered as a bounding volume 20. Bounding volume 20 may have any suitable shape and need not conform to any regular or irregular geometric shape. In accordance with one or more embodiments of the present invention, bounding volume 20 may be a part of event space 15 or the entirety of event space 15.

Bounding volume 20 may be based on first scene center 71a; for example, scene center 71a may be located at one end of the event space as when a goal is being scored and, thus, configuration and rendering of the other end may not be required.

Step 410 may also be performed by controller 105, which based on scene 70a that has been selected, determines the regions of event space 15 where a density of data points, features, or the like meet a predetermined threshold. Controller 105 then determines bounding volume 20 based on statistical analysis.

In a step 412, configuration engine 401 uses 3D point reconstruction 62 to create one or more geometry shadow maps 413, i.e., matting, that depict the occlusion by another object in reconstruction 62 and/or mask model 223 when projected from the specific location of camera 66a associated with the novel view of scene center 71b.

A first type of occlusion is encountered when a virtual rendering camera 66a is projected through an object that it should be projected on and the second type of occlusion occurs when a part of the object occludes itself, such as the hand of a player is in the foreground relative to virtual rendering camera 66a and occludes a portion of the player's torso.

In a step 414, configuration engine 401 creates a depth map 415 to solve occlusion for each real camera 115 on the camera list in order. Depth map 415 comprises a distance between each feature and a focus center, i.e., 3D scene center 407, of the plane comprising virtual camera 66a associated with scene 71b, i.e., normalized distance. The distance is determined by triangulation between the camera location of virtual camera 66a and each pixel.

Depth map 415 may be saved as a database representing preferably one or more pixels in 3D data representation 60 with a 3D coordinate, an RGB color (based on the additive color model in which red, green, and blue light are added), and normalized vector information from the pixel.

In the alternative or in addition, depth map 415 is a "splat" based structure where each three dimensional point (or "voxel") collects the color information from various sensors while considering any occlusions.

For example, if a white glove is covered by a red shirt in a second camera, the information preferably comprises XYZ position, a normal orientation vector, and color per camera 115. The color information with respective camera positions may be: first camera—white, second camera—white, third camera—white, fourth camera—null (occluded).

In a step 416, configuration engine 401 combines environment model 223 and foreground model 423 into novel view 66 and softens around the edges of the depth map in order to reduce noise in the overlay edges and/or may blur the non-centered areas of novel view 66, by for example, using Gaussian blur.

In a step 418, configuration engine 401 outputs novel view 66 to the user in preferably photo-realistic quality. Critical to the photo-realistic quality is that color value and luma values are adjusted after reconstruction of the 3D data representation 60. Therein, configuration engine 401 performs a per-pixel calculation of physical phenomena such as depth of field and motion blur, which are calculated in true 3D space.

In a step 420, configuration engine 401, responsive to view path 68 and a change in scene center to a new scene center, i.e., a third scene center, that coincides with a novel view 66, executes configuration method 400 again beginning with the new scene center to render a further novel view.

In the alternative or in addition, novel view 66 is preferably "rasterized" and, therein, not necessarily from the scene center, but rather as a two dimensional raster viewed via the novel view camera.

In a static setting, the grabbed frames 40 used in the reconstruction of the next novel view are from an image frame set 7 captured at imaging reference time TM. In a dynamic setting, the grabbed frames 40 used in the reconstruction of the next novel view are from an image frame set 7 captured between imaging reference time $T_{M1}$ and TM2.

A plurality of rendered sequences of one or more novel views 66 and/or one or more views coincident with view fields 117 along a view path 68 make up a replay 64.

In a step 422, at a conclusion, controller 105 outputs replay 64 to a user-viewer in a suitable format. For example, if the user-viewer is a television network, the replay 64 may be in the format of a sequence of lossless images, which are fed to the broadcaster via a conversion to an HD-SDI feed via suitable conversion hardware.

Interactive Player

Figure 12B:
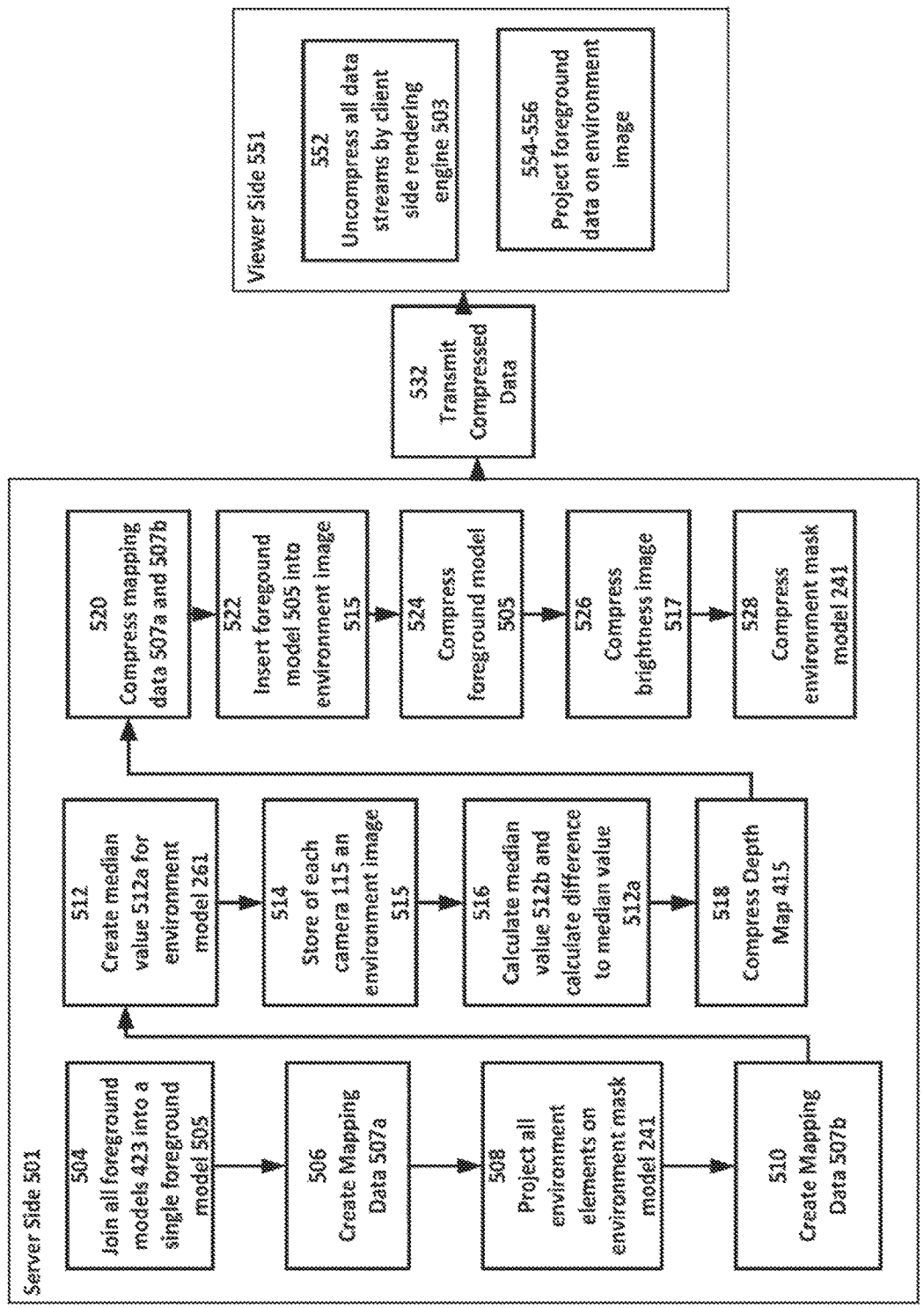
FIG. 12B is a schematic diagram of an interactive player system 500 in accordance with one or more embodiments of the present invention.

FIG. 12B is a schematic diagram of an interactive player system 500 in accordance with one or more embodiments of the present invention.

In accordance with one or more embodiments of the present invention, a novel-view interactive player system 500 comprises a server side 501 and a viewer side 551 to receive by a viewer on a viewing device, configured as a computing device, compressed files for user-selectable viewing.

Player system 500 may be embodied as a physical computing device with server side 501 or associated with any other computing device, but preferably is software executing in controller 105 to allow for ease of adding one or more functions and viewer side 551 on a viewing device.

In accordance with one or more embodiments of the present invention, a user utilizes a plurality of modules system 500 to execute a transmission and reception method comprising steps 504-562.

Server Side

Preferably, server side 501 is preferably configured substantially similar to system 100 described previously. Where necessary, an initial set-up method 200, a CEM method 220, and a SD method 260 will have been performed. An environment modeling method 220 will have been performed to obtain an environmental model 223; and, if advantageous, a SD method 260 is performed to obtain crop mask 263 and (RLE) database 265. An event capture method 300 will have been performed to obtain 3D data representation 60. A depth map 415 will have been created for each camera 115. A foreground/environment segmentation method 318a will have been performed for each camera 115 and foreground models 423 obtained for each camera 115.

Thus, system 100 performs capturing a plurality of synchronous image frames 5 from at least three cameras 115, extracting image data 6 from the image frames, and reconstructing, for each camera 115, image data 6 into at least one environment model 223 and at least one foreground model 423. In accordance with one or more embodiments of the present invention, a transmission method 502 prepares a plurality of data 502a for transmission to the viewer side 551. Therein, steps 504-530 comprise a rasterization pipeline.

In a step 504, configuration engine 401 joins all foreground models 423 together into a single foreground model 505, i.e., a visual atlas, to maintain adjacency and completeness of foreground data. The adjacency is kept so that neighboring foreground pixels in an image captured remain neighboring pixels with same neighboring position in the new image.

In a step 506, configuration engine 401 creates mapping data 507a, e.g., a look-up table, that associates a location of a pixel or image data in single foreground model 505 to the original 3D coordinate of the pixel in 3D data representation 60, i.e., in a per point correlation. Therein, each pixel is sorted according to their occlusion value and inserted in an octree, further described herein.

In a step 508, configuration engine 401 projects for each camera 115 all environment elements obtained via foreground/environment segmentation method 318a for that respective camera 115 onto the environment model 223 to update the color values using a normalized vector, i.e., an imaginary line is drawn from a pixel in the image onto a point of intersection of the environment model 223. That is, configuration engine 401 projects for a particular camera 115 all environment elements obtained via foreground/environment segmentation method 318a for that particular camera 115 onto the environment model 223 to update the color values using a normalized vector, i.e., an imaginary line is drawn from a pixel in the image onto a point of intersection of the environment model 223.

In the alternative or in addition in step 508, the color information is assigned, i.e., projected, to each 3D point or voxel from all non-occluded pixels from each camera 115 such that color information is associated with the pixel.

In a step 510, configuration engine 401 creates mapping data 507b, e.g., a look-up table, that associates a location of a pixel in environment model 223 to the original 3D coordinate of the pixel in 3D data representation 60, i.e., in a per point correlation.

In a step 512, configuration engine 401 calculates a median value 512a of for environment model 223 to create environmental values that are less affected by foreground or different camera parameter differences. Therein, a shader 333 using shading method 331a and/or 331b determines which pixels are rendered as environment 16, i.e., background; which feature 57 is occluded by a foreground feature 57; and determines that color with different blending parameters from the colors of cameras 115 in positional physical sequence.

In a step 514, configuration engine 401 stores for each camera 115 an environment image 515 of environment model 223 from a view of each camera 115 to represent the static environment throughout the set. That is, each environment model 223 is saved as an image file 515

In a step 516, configuration engine 401 calculates a median value 512b for each environment image 515 and calculates a difference 512c to median value 512a. Configuration engine 401 saves the difference expressed as luma values in a brightness image 517 for each camera 115. Therein, the background color information saves the color information only once, and saves any deltas-per-frame of luma only resulting in significantly increased processing time.

In a step 518, configuration engine 401 compresses depth map 415 using any compression algorithm known. Preferably, lossless compression is used. However, lossy compression may also be used.

In a step 520, configuration engine 401 compresses mapping data 507a and 507b using any compression algorithm known. Preferably, lossless compression is used. However, lossy compression may also be used.

In a step 522, configuration engine 401 inserts foreground model 505 into environment image 515 as a new frame in an image sequence by projecting background rasters on background geometry or, in the alternative or in addition, transmitted as rasters rather than saved as an image sequence.

The 3D data representation 60 (e.g., point cloud) and raster data are decompressed, if necessary, into memory 110a or 110b, one of which is preferably a graphical processor memory, or directly into the memory of the graphical processor memory. Then, background hole filling image is created Processing and rendering per "novel view" raster pixel requires
- looping through sorted cameras (max number of cameras can be limited);
- referencing the points (voxels) in the visual projection "atlas";
- using an exponential matrix to decide the weight of projection, based on the angle values calculated in the projection sorting;

calculating a float weight=(0.5*pow(angleFactor, projectorWeightFactor))+(0.5*pow(angleFactor, projectorWeightFactor1));

obtaining depth and color and paint the pixel accordingly;
summing up the weighted colors to get final colors also consider transparency;
sampling (antialiasing) pixels for smooth edges; and
implementing compositing and\or post effects per pixel.
The compositing and\or post effects may include:
1. Depth of field: Using the focal length and additional intrinsic lens parameters of the virtual rendering camera, create a blurring effect on pixels that are located outside the depth of field.
2. Camera Motion Blur: Using the motion vector and additional extrinsic and intrinsic lens parameters of the virtual camera, create a blurring and smearing effect on pixels emulating shutter speed and exposure length effects on objects in the captured scene changing in different speeds.
3. Refraction: Using calculations of projections of light onto the rendered scene, and light responsivity of each voxel element in the scene, create light interactions and effects. Calculations may be as simplified as mirroring effects or as complicated as infinitely resonating traced rays.
4. 2D imagery Overlay. The ability to add two dimensional raster graphics, such as text.
5. 3D imagery Overlay. The ability to add three dimensional raster graphics, both interactive with the scene such as a 3 dimensional 1st and down line, or non interactive such as a broadcasting channel logo.
6. Image Combiner. Overlay several sources of imagery data from different sources. Sources may be video or static images.
7. 3D dust. Create the effect of speckles and particles interacting with scene lighting.
8. Color Correction. Change the color space of an image by using simple to intricate functions. Simple functions may include Gamma, gain, etc., and intricate functions may include lookup tables that are derived from any possible function within the scene or sourced elsewhere.

In a step 524, configuration engine 401 compresses foreground model 505 using any compression algorithm known. Preferably, lossless compression is used. However, lossy compression may also be used.

In accordance with one or more embodiments of the present invention, in order to efficiently compress the foreground model 505, the compression algorithm may be one or more tree data structure, such as octree, in order to focus on the data that is most dense.

For example, the octree compression is applied per 30 data representation 60 and is performed as described. The event space 10 is divided in a static method, creating many identical subvolumes, i.e., children. Mesh points are placed in a full octree format, i.e. children that do not contain points are represented as empty children in the octree. An ascending index is provided to each child of the octree, starting from 0. All 8 children of same parent have sequential numbers, and sequential parents have a difference of 8 in their childrens' index. The difference of the sequential index of the lowest order of parents is stored, along with the full/empty status of the children. The difference sequence is lossless LZW compressed.

In accordance with one or more embodiments of the present invention, the configuration engine 401 compresses foreground model 505 according to the following substeps:

1. After 30 data representation 60 has been built, configuration engine 401 attempts to project each pixel from the 30 data representation 60 to all cameras 115 and marks which cameras could image each pixel. Configuration engine 401 marks which pixels could be imaged and which pixels could not be imaged from that camera and saves this information 30 data representation 60.
2. All pixels that are seen by same set of cameras 115 are collected by the configuration engine 401 onto a single octree to be compressed as described herein and saves the octree to one or more memories. Advantageously, using octree is used to speed up rendering at the display stage.
3. Configuration engine 401 considers all pixels that are seen within an image are considered foreground. All foreground data from all cameras is combined by configuration engine 401 onto a single foreground frame image.
4. If configuration engine 401 determines foreground data is too big to fit as is, it is broken into blocks that are placed by configuration engine 401 in empty block location in foreground frame image.
5. Configuration engine 401 maps the foreground frame image as foreground model 505 along with the building of the foreground frame.

In a step 526, configuration engine 401 inserts brightness image 517 into environment image 515 as a new frame in an image sequence or, in the alternative or in addition, transmitted as rasters rather than saved as an image sequence.

In a step 528, configuration engine 401 compresses brightness image 517 using any compression algorithm known. Preferably, lossless compression is used. However, lossy compression may also be used.

In a step 528, configuration engine 401 compresses environment images 515 using any compression algorithm known. Preferably, lossless compression is used. However, lossy compression may also be used.

In a step 530, configuration engine 401 compresses environment model 223 using any compression algorithm known. Preferably, lossless compression is used. However, lossy compression may also be used.

In a step 532, controller 105 transmits each compressed data in the sequence it was compressed.

In accordance with one or more embodiments of the present invention, a reception method 550 executes a client side rendering engine 503 of a computing device of the viewer side 501 in order to receive and render transmission data 502a into replay 64.

Viewer Side

In a step 552, rendering engine 503 receives and uncompresses in the sequence in which it was compressed.

In a step 554, rendering engine 503 recreates environment image 515 on a memory of the viewing device. Environment image 515 is created according to the novel view 66, i.e., virtual camera, selected by the user via the user interface of the player. Environment images 515 that were extracted in step 552 are blended and projected onto the environment model 223 extracted in step 552. The blending of the images is performed by weighting the angular distance of the virtual camera from the cameras that captured the background images.

In a step 556, rendering engine 503 recreate environment values are recreated on a memory of the viewing device. These values are recreated according to the novel view 66, i.e., virtual camera, selected by the user via the user interface of the player.

In a step 558, rendering engine 503 uses mapping data 507a and 507b extracts in step 552 to reposition the pixels of environment images 515 mapped onto the mapped image extracted in step 552. Then, occlusion data extracted in step 552 is used in order to ignore the irrelevant pixel, i.e., voxel, values for novel view 66.

In a step 560, rendering engine 503 overlays the luma differences on environment image 515 that was recreated in step 554 to recreate shadows, highlights, and bounce (brightness differences) on the background. The result background image is displayed on the screen of the viewing device.

In a step 562, rendering engine 503 projects recreated data of environment images 515 onto the environment model 223 according to novel view 66 to form foreground features applied on top of the background image created in step 560, and displayed as rendered novel view images or sequences of images on the screen of the viewing device.

Rendering engine 503 then repeats one or more steps 552-562 to create new novel view rendered images or sequences of images on the screen of the viewing device within bounding volume 20. That is, novel views are unable to represent event 10 outside of the bounding volume.

Examples of Use

In accordance with one or more embodiments of the present invention, system 100 and novel-view player system 500 is used by one or more users to view event 10 while it is happening or after it has been recorded.

One or more user-viewer 2 may be located anywhere in event 10, around event 10, or any other suitable location. Each user preferably has a computing device with a client-side rendering device 503 to receive transmission data 502a as propagated by system 500. System 100 and system 500 may be disposed proximal to each other, as for example in a sports venue. Therein, one user-viewer may be located far away from where the main sports action is occurring. After receiving transmission data 502a, the user-view can also view the action as replay 64. Using a view path 68 of the user-viewer's choice, novel views 66 may be shown to user-viewer 2.

Moreover, systems 100 and 500 and/or the viewing device comprises one or more social messaging modules, i.e., features, such modules as are known in the art may be used for direct text messaging, wall postings, uploading content to the internet, and/or broadfield broadcasting. The social messaging features or any other part of system 100 and/or 500 preferably incorporate replay 64 in whole or in part, hyperlinks to replay 64 in its entirety or to certain reference locations of replay 64. The systems and/or the viewing device further comprise one or more data manipulation modules for saving novel-views as images, rendered clips, and/or camera view paths 68 for further use and/or reference and, if so desired by a user, shared with one or more other users to one or more user accessible databases, e.g., social network databases.

Advantageously, using system 500, each user may create their own database of scenes and images and send them to one or more other users via any desirable means, for example, social networks or an access port to a social network. The recipient users are then able to determine their user-selectable novel view images and video and discuss these.

Replay 64 may be used by sports game officials to determine the validity of a score or fans to discuss amongst themselves or others interesting or controversial sporting action and using one or more novel views 66 to provide evidence of their point of view.

In accordance with one or more embodiments of the present invention, system 100 and/or subsystem, a plurality of replays 64 in different events 10 may be made and overlaid as a comparison to make a further cumulative replay 64. For example, during or after a baseball games, replays 64 of a number of players taking turns at the bat can be compared to illustrate various types of batting styles.

Therein, in a comparison method, a user creates a plurality of replays 64 for each relevant and interesting event, i.e., grabbed frame sets, whether of a frozen moment or a sequence of images, each of which may contain a reference point, such as a view of a baseball homeplate (for example, corner of a homeplate) to illustrate various pitches during a game and their success with various batters. Each data set of the imager frames may be uploaded to one or more websites for a plurality of users to evaluate and to interact with each other and the creator of the data sets.

While the invention has been described in conjunction with specific embodiments, it is to be understood that many alternatives, modifications, and variations will be apparent to those skilled in the art in light of the foregoing description.

What is claimed is:

1. A method, comprising:
  recording an event in an event space by a plurality of cameras, the plurality of cameras recording a plurality of imaging frames;
  creating an imaging mask for each camera of the plurality of cameras;
  comparing, for each camera, the corresponding imaging mask to a corresponding sub-volume mask, the sub-volume mask generated by projecting from each camera each of a plurality of sub-volumes of the event space, and extracting at least one feature from at least one imaging mask, the at least one feature related to the event;
  saving the at least one feature to a subspace division mask;
  cropping the at least one feature from the imaging frames using the subspace division mask; and
  processing the at least one feature for a 3D reconstruction.

2. The method of claim 1, further comprising:
  storing each of the sub-volume masks in a storage location.

3. The method of claim 1, further comprising:
  storing each sub-volume mask associated with its respective camera in a storage location associated with that respective camera.

4. The method of claim 1, further comprising:
  storing for each camera a listing of all sub-volumes having at least one feature in a matrix.

5. The method of claim 4, wherein processing the at least one feature for a 3D reconstruction, further comprises:
  processing only the at least one feature in a sub-volume listed in the matrix.

6. The method of claim 1, further comprising:
  determining a volume of the event space, wherein the plurality of sub-volumes are generated by dividing the volume into the plurality of sub-volumes.

7. The method of claim 1, further comprising:
  performing stabilization to remove outlier features from the at least one feature.

8. A non-transitory computer readable storage medium including instructions stored thereon which, when executed by one or more processors, cause the one or more processors to:

record an event in an event space by a plurality of cameras, the plurality of cameras recording a plurality of imaging frames;

create an imaging mask for each camera of the plurality of cameras;

compare, for each camera, the corresponding imaging mask to a corresponding sub-volume mask, the sub-volume mask generated by projecting from each camera each of a plurality of sub-volumes of the event space, and extracting at least one feature from at least one imaging mask, the at least one feature related to the event;

save the at least one feature to a subspace division mask;

crop the at least one feature from the imaging frames using the subspace division mask; and process the at least one feature for a 3D reconstruction.

9. The non-transitory computer readable storage medium of claim 8, wherein the instructions, when executed, further cause the one or more processors to:

store each of the sub-volume masks in a storage location.

10. The non-transitory computer readable storage medium of claim 8, wherein the instructions, when executed, further cause the one or more processors to:

store each sub-volume mask associated with its respective camera in a storage location associated with that respective camera.

11. The non-transitory computer readable storage medium of claim 8, wherein the instructions, when executed, further cause the one or more processors to:

store for each camera a listing of all sub-volumes having at least one feature in a matrix.

12. The non-transitory computer readable storage medium of claim 11, wherein the instructions to process the at least one feature for a 3D reconstruction, when executed, further cause the one or more processors to:

process only the at least one feature in a sub-volume listed in the matrix.

13. The non-transitory computer readable storage medium of claim 8, wherein the instructions, when executed, further cause the one or more processors to:

determine a volume of the event space, wherein the plurality of sub-volumes are generated by dividing the volume into the plurality of sub-volumes.

14. The non-transitory computer readable storage medium of claim 8, wherein the instructions, when executed, further cause the one or more processors to:

perform stabilization to remove outlier features from the at least one feature.

15. A system, comprising:

a plurality of cameras for recording an event in a plurality of imaging frames;

a controller coupled to the plurality of camera, the controller including instructions which, when executed by one or more processors, cause the controller to:

create an imaging mask for each camera of the plurality of cameras;

compare, for each camera, the corresponding imaging mask to a corresponding sub-volume mask, the sub-volume mask generated by projecting from each camera each of a plurality of sub-volumes of the event space, and extracting at least one feature from at least one imaging mask, the at least one feature related to the event;

save the at least one feature to a subspace division mask;

crop the at least one feature from the imaging frames using the subspace division mask; and process the at least one feature for a 3D reconstruction.

16. The system of claim 15, wherein the instructions, when executed, further cause the controller to:

store each of the sub-volume masks in a storage location.

17. The system of claim 15, wherein the instructions, when executed, further cause the controller to:

store each sub-volume mask associated with its respective camera in a storage location associated with that respective camera.

18. The system of claim 15, wherein the instructions, when executed, further cause the controller to:

store for each camera a listing of all sub-volumes having at least one feature in a matrix.

19. The system of claim 18, wherein the instructions to process the at least one feature for a 3D reconstruction, when executed, further cause the controller to:

process only the at least one feature in a sub-volume listed in the matrix.

20. The system of claim 15, wherein the instructions, when executed, further cause the controller to:

determine a volume of the event space, wherein the plurality of sub-volumes are generated by dividing the volume into the plurality of sub-volumes.

* * * * *